(12) United States Patent
Choi et al.

(10) Patent No.: US 12,516,151 B2
(45) Date of Patent: *Jan. 6, 2026

(54) RESIN, PREPARATION METHOD THEREFOR, RESIN COMPOSITION, AND MOLDED ARTICLE

(71) Applicant: LG Chem, Ltd., Seoul (KR)

(72) Inventors: Il Hwan Choi, Daejeon (KR); Kyeongmun Kim, Daejeon (KR); Min Suk Jung, Daejeon (KR); Jaesoon Bae, Daejeon (KR); Hyeonah Shin, Daejeon (KR); Hye Jin Yim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 322 days.

This patent is subject to a terminal disclaimer.

(21) Appl. No.: 18/037,679

(22) PCT Filed: Sep. 2, 2022

(86) PCT No.: PCT/KR2022/013216
§ 371 (c)(1),
(2) Date: May 18, 2023

(87) PCT Pub. No.: WO2023/033596
PCT Pub. Date: Mar. 9, 2023

(65) Prior Publication Data
US 2024/0043610 A1 Feb. 8, 2024

(30) Foreign Application Priority Data

Sep. 3, 2021 (KR) .................. 10-2021-0117642
Jun. 30, 2022 (KR) .................. 10-2022-0080561
Jun. 30, 2022 (KR) .................. 10-2022-0080564

(51) Int. Cl.
*C08G 63/42* (2006.01)
*C08G 63/183* (2006.01)
*G02B 1/04* (2006.01)

(52) U.S. Cl.
CPC .......... *C08G 63/42* (2013.01); *C08G 63/183* (2013.01); *G02B 1/041* (2013.01)

(58) Field of Classification Search
CPC combination set(s) only.
See application file for complete search history.

(56) References Cited

U.S. PATENT DOCUMENTS

2007/0100118 A1    5/2007  Chatterjee et al.
2015/0285954 A1   10/2015  Shizuka et al.
(Continued)

FOREIGN PATENT DOCUMENTS

CN    110062792 A    7/2019
CN    116507662 A    7/2023
(Continued)

OTHER PUBLICATIONS

Khan D. et al, "Synthesis and Mesophase Characterization of Liquid Crystalline Polyestrs With Bulky, Rigid, Lateral Substituents," Journal of polymer science part B polymer physics, Nov. 1994, vol. 32, Issue 15, pp. 2509-2518.
(Continued)

*Primary Examiner* — Randy P Gulakowski
*Assistant Examiner* — Audra J Destefano
(74) *Attorney, Agent, or Firm* — Lerner David LLP

(57) ABSTRACT

A resin, a method for preparing the same, a resin composition including the same, and a molded article including the resin composition are disclosed in herein. In some embodiments, a resin includes a unit of Chemical Formula 1 and a unit of Chemical Formula 2:

(Continued)

[Chemical Formula 1]

$$*+\left(\left(+La''+\right)_m^O X3+Z1-X1+\right)_a\left(\begin{array}{c}Ar1\\ \\Ar2\end{array}(R1)_{r1}\right)$$

$$+X2-Z2+_b-X4+\left(La\left\{X9+Z5-X10+\right\}_p\right)_n+_r*$$

[Chemical Formula 2]

$$*+\left(\left(+Lb'+\right)_{m''}^O X14+Z11-X11+\right)_{a'}+L11+_{l11}+X12-$$

$$-Z12+_{b'}-X13+\left(Lb\left\{X15+Z13-X16+\right\}_{p'}\right)_{n''}+_{r'}*$$

wherein, in Chemical Formulae 1 and 2, Ar1, Ar2, R1, r1, X1 to X4, X9, X10, Z1, Z2, Z5, La, La'', a, b, p, t, m, n, L11, l11, X11 to X16, Z11 to Z13, Lb, Lb', a', b', p', C'', m'' and n'' are defined herein.

12 Claims, 1 Drawing Sheet

(56) References Cited

U.S. PATENT DOCUMENTS

| | | | |
|---|---|---|---|
| 2015/0362629 A1* | 12/2015 | Umetani | G02B 1/04 977/779 |
| 2019/0233640 A1* | 8/2019 | Park | C08L 67/04 |
| 2019/0235258 A1 | 8/2019 | Kato et al. | |
| 2020/0087509 A1 | 3/2020 | Jung et al. | |
| 2021/0171706 A1* | 6/2021 | Lee | C08G 63/183 |

FOREIGN PATENT DOCUMENTS

| | | |
|---|---|---|
| EP | 4239007 A1 | 9/2023 |
| JP | S63185992 A | 8/1988 |
| JP | 663280731 A | 11/1988 |
| JP | H01272629 A | 10/1989 |
| JP | 2013001867 A | 1/2013 |
| JP | 2021014521 A | 2/2021 |
| KR | 20150082410 A | 7/2015 |
| KR | 20190041544 A | 4/2019 |

OTHER PUBLICATIONS

Korshak, V. V et al. "9,9-Bis(4-hydroxyphenyl)fluorene polyarylates" Chemical Abstract, 1969, 70: Doklady Akademii Nauk SSSR. 1968, vol. 181, No. 6, pp. 1393-1396.

Yin, Z. et.al. "A Supramolecular bottlebrush polymer assembled on the basis of curcurbit(8)uril-encapsulation-enhanced donor-acceptor interaction," Chinese Chemical Letters, Mar. 2017, vol. 28, vol. 6, pp. 1167-1171.

International Search Report for PCT/KR2022/013216 mailed Dec. 26, 2022. 4 pages.

* cited by examiner

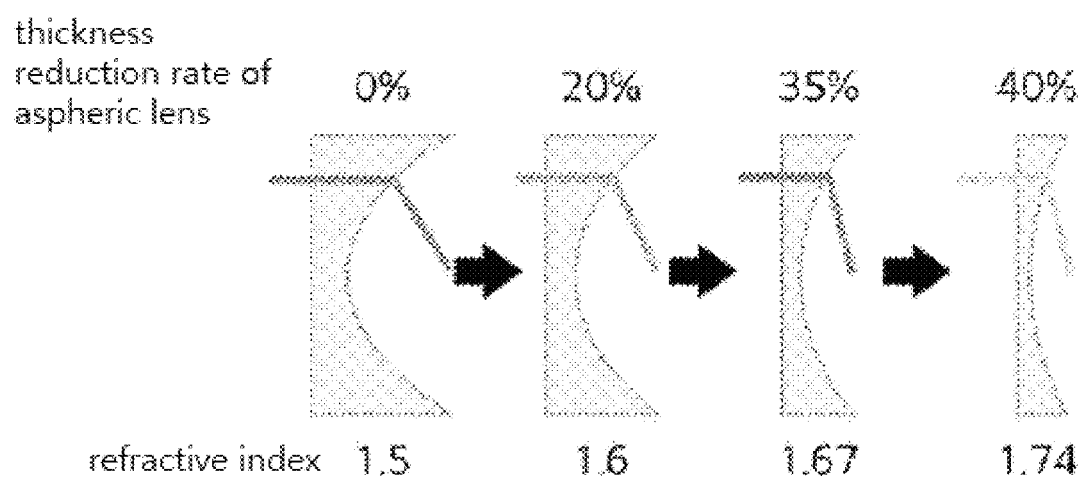

RESIN, PREPARATION METHOD THEREFOR, RESIN COMPOSITION, AND MOLDED ARTICLE

CROSS-REFERENCE TO RELATED APPLICATIONS

This application is a national phase entry under 35 U.S.C. § 371 of International Application No. PCT/KR2022/013216, filed on Sep. 2, 2022, which claims priority from Korean Patent Application Nos. 10-2021-0117642, 10-2022-0080564, and 10-2022-0080561, filed on Sep. 3, 2021, Jun. 30, 2022, and Jun. 30, 2022, respectively, all the disclosures of which are incorporated by reference herein.

TECHNICAL FIELD

The present disclosure relates to a resin and a method for preparing the same, a resin composition, and a molded article.

BACKGROUND ART

The higher the refractive index of an optical material, the thinner the optical lens required to achieve the same level of correction. Accordingly, as the refractive index of the optical material is increased, a thinner and lighter lens can be manufactured, so that it is possible to make various devices, where lenses are used, smaller.

Generally, when the refractive index of an optical material is increased, there is a problem in that the Abbe's Number becomes low, and for use as an optical material, a certain level or higher of transparency is required.

BRIEF SUMMARY

Technical Problem

An exemplary embodiment of the present disclosure has been made in an effort to provide a resin having a novel structure and a method for preparing the same.

Another exemplary embodiment of the present disclosure has been made in an effort to provide a composition including a resin having a novel structure and a molded article prepared from the composition.

Technical Solution

An exemplary embodiment of the present disclosure provides a resin including a unit of the following Chemical Formula 1 and a unit of the following Chemical Formula 2.

In Chemical Formulae 1 and 2,

Ar1 and Ar2 are the same as or different from each other, and are each independently a substituted or unsubstituted aryl group; or a substituted or unsubstituted heteroaryl group, R1 is hydrogen; deuterium; a halogen group; a cyano group; a substituted or unsubstituted alkyl group; a substituted or unsubstituted cycloalkyl group; a substituted or unsubstituted alkoxy group; a substituted or unsubstituted silyl group; a substituted or unsubstituted aryl group; or a substituted or unsubstituted heteroaryl group, r1 is an integer of 1 or 2, and when r1 is 2, two R1's are the same as or different from each other, X1 to X4, X9 and X10 are the same as or different from each other, and are each independently O; or S, Z1, Z2 and Z5 are the same as or different from each other, and are each independently a substituted or unsubstituted alkylene group; a substituted or unsubstituted cycloalkylene group; a substituted or unsubstituted arylene group; or a substituted or unsubstituted heteroarylene group, La and La" are the same as or different from each other, and are each independently a direct bond; or —C(=O)-L-, L is a substituted or unsubstituted arylene group, a, b and p are the same as or different from each other, and are each independently an integer from 0 to 6, and when a, b and p are each 2 or higher, structures in the parenthesis are the same as or different from each other, t is an integer from 1 to 6, and when t is 2 or higher, structures in the parenthesis are the same as or different from each other, m and n are the same as each other, and are 0 or 1, when m and n are 0, t, r and s are 1, and La is —C(=O)-L-, when m and n are 1, t is an integer from 1 to 6, r+s=1, r is a real number of 0<r<1 as a mole fraction, and s is a real number of 0<s<1 as a mole fraction, L11 is a substituted or unsubstituted alkylene group; a substituted or unsubstituted cycloalkylene group; or a substituted or unsubstituted arylene group, l11 is an integer from 1 to 5, and when l11 is 2 or higher, two or more L11's are the same as or different from each other, X11 to X16 are the same as or different from each other, and are each independently O; or S, Z11 to Z13 are the same as or different from each other, and are each independently a substituted or unsubstituted alkylene group; or a substituted or unsubstituted cycloalkylene group,

[Chemical Formula 1]

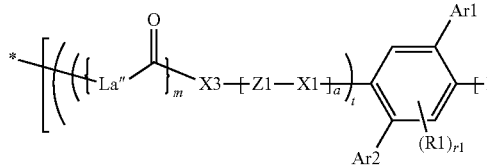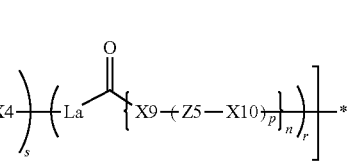

[Chemical Formula 2]

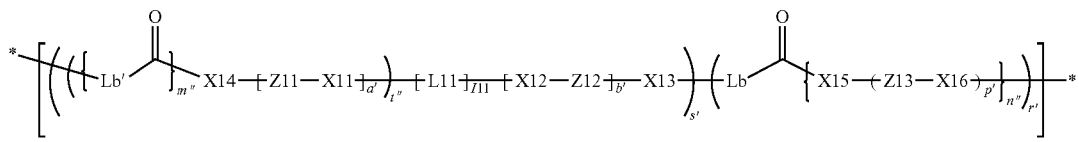

Lb and Lb' are the same as or different from each other, and are each independently a direct bond; or —C(=O)-L'-, L' is a substituted or unsubstituted arylene group, a', b' and p' are the same as or different from each other, and are each independently an integer from 0 to 6, and when a', b' and p' are each 2 or higher, structures in each parenthesis are the same as or different from each other, t" is an integer from 1 to 6, and when t" is 2 or higher, structures in the parenthesis are the same as or different from each other, m" and n" are the same as each other, and are 0 or 1, when m" and n" are 0, t", r' and s' are 1, and Lb is —C(=O)-L'-, when m" and n" are 1, t" is an integer from 1 to 6, r'+s'=1, r' is a real number of 0<r'<1 as a mole fraction, and s' is a real number of 0<s'<1 as a mole fraction, and

* means a moiety linked to the main chain of the resin.

An exemplary embodiment of the present disclosure provides a method for preparing the resin, the method including: polymerizing a composition for preparing a resin, which includes a compound of the following Chemical Formula 1a; a compound of the following Chemical Formula 2a; and 1) a polyester precursor, or 2) a polyester precursor and a polycarbonate precursor.

[Chemical Formula 1a]

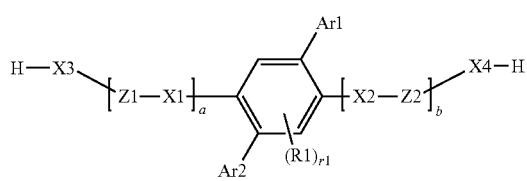

[Chemical Formula 2a]

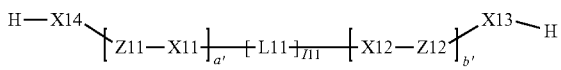

In Chemical Formulae 1a and 2a, the definitions of Ar1, Ar2, R1, r1, X1 to X4, Z1, Z2, a and b are the same as those defined in Chemical Formula 1, and L11, l11, X11 to X14, Z11, Z12, a' and b' are the same as those defined in Chemical Formula 2.

Another exemplary embodiment of the present disclosure provides a resin composition including the resin according to the above-described exemplary embodiment.

Still another exemplary embodiment of the present disclosure provides a molded article including the resin composition according to the above-described exemplary embodiment.

Advantageous Effects

The resin according to the exemplary embodiments of the present disclosure has a high refractive index and high transparency.

By using the resin according to the exemplary embodiments of the present disclosure, an excellent optical lens can be obtained.

BRIEF DESCRIPTION OF DRAWINGS

The FIGURE is a view illustrating the reduction rate of lens thickness depending on the difference in refractive index.

DETAILED DESCRIPTION

Hereinafter, specific exemplary embodiments will be described in more detail.

Throughout the specification of the present application, the term "combination thereof" included in the Markush type expression means a mixture or combination of one or more selected from the group consisting of constituent elements described in the Markush type expression, and means including one or more selected from the group consisting of the above-described constituent elements.

Examples of the substituents in the present specification will be described below, but are not limited thereto.

In the present specification,

means a moiety to be linked.

In the present specification, the term "substitution" means that a hydrogen atom bonded to a carbon atom of a compound is changed into another substituent, and a position to be substituted is not limited as long as the position is a position at which the hydrogen atom is substituted, that is, a position at which the substituent may be substituted, and when two or more are substituted, the two or more substituents may be the same as or different from each other.

In the present specification, the term "substituted or unsubstituted" means being substituted with one or more substituents selected from the group consisting of deuterium; a halogen group; a hydroxyl group; a cyano group; an alkyl group; a cycloalkyl group; an alkoxy group; an alkenyl group; an aryloxy group; an arylthio group; alkylthio group; a silyl group; an aryl group; a condensed ring group of an aromatic hydrocarbon ring and an aliphatic hydrocarbon ring; and a heterocyclic group, being substituted with a substituent to which two or more substituents among the exemplified substituents are linked, or having no substituent.

In the present specification, the fact that two or more substituents are linked indicates that hydrogen of any one substituent is linked to another substituent. For example, when two substituents are linked to each other, a phenyl group and a naphthyl group may be linked to each other to become a substituent of

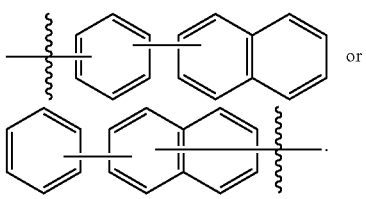 or

Further, the case where three substituents are linked to one another includes not only a case where (Substituent 1)-(Substituent 2)-(Substituent 3) are consecutively linked to one another, but also a case where (Substituent 2) and (Substituent 3) are linked to (Substituent 1). For example, a phenyl group, a naphthyl group, and an isopropyl group may be linked to one another to form a substituent of

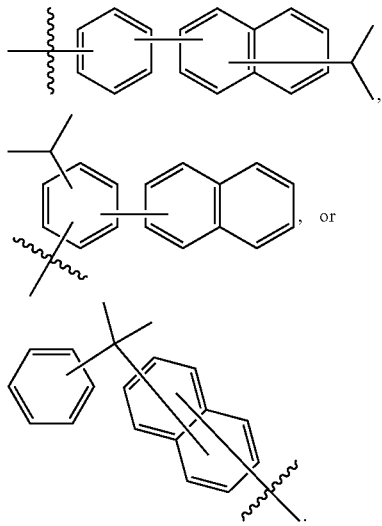

The above-described definition also applies equally to the case where four or more substituents are linked to one another.

In the present specification, examples of the halogen group include fluorine, chlorine, bromine or iodine.

In the present specification, the alkyl group may be straight-chained or branched, and the number of carbon atoms thereof is not particularly limited, but is preferably 1 to 30. Specific examples thereof include a methyl group, an ethyl group, a propyl group, an n-propyl group, an isopropyl group, a butyl group, an n-butyl group, an isobutyl group, a tert-butyl group, a sec-butyl group, a 1-methyl-butyl group, a 1-ethyl-butyl group, a pentyl group, an n-pentyl group, an isopentyl group, a neopentyl group, a tert-pentyl group, a hexyl group, an n-hexyl group, a 1-methylpentyl group, a 2-methylpentyl group, a 4-methyl-2-pentyl group, a 3,3-dimethylbutyl group, a 2-ethylbutyl group, a heptyl group, an n-heptyl group, a 1-methylhexyl group, a cyclopentylmethyl group, a cyclohexylmethyl group, an octyl group, an n-octyl group, a tert-octyl group, a 1-methylheptyl group, a 2-ethylhexyl group, a 2-propylpentyl group, an n-nonyl group, a 2,2-dimethylheptyl group, a 1-ethyl-propyl group, a 1,1-dimethyl-propyl group, an isohexyl group, a 2-methylpentyl group, a 4-methylhexyl group, a 5-methylhexyl group, and the like, but are not limited thereto.

In the present specification, the cycloalkyl group is not particularly limited, but has preferably 3 to 30 carbon atoms, and specific examples thereof include a cyclopropyl group, a cyclobutyl group, a cyclopentyl group, a 3-methylcyclopentyl group, a 2,3-dimethylcyclopentyl group, a cyclohexyl group, a 3-methylcyclohexyl group, a 4-methylcyclohexyl group, a 2,3-dimethylcyclohexyl group, a 3,4,5-trimethylcyclohexyl group, a 4-tert-butylcyclohexyl group, a cycloheptyl group, a cyclooctyl group, an adamantyl group, and the like, but are not limited thereto.

In the present specification, the alkoxy group may be straight-chained, branched, or cyclic. The number of carbon atoms of the alkoxy group is not particularly limited, but is preferably 1 to 30. Specific examples thereof include a methoxy group, an ethoxy group, an n-propoxy group, an isopropoxy group, an n-butoxy group, an isobutoxy group, a tert-butoxy group, a sec-butoxy group, an n-pentyloxy group, an neopentyloxy group, an isopentyloxy group, an n-hexyloxy group, a 3,3-dimethylbutyloxy group, a 2-ethylbutyloxy group, an n-octyloxy group, an n-nonyloxy group, an n-decyloxy group, a benzyloxy group, a p-methylbenzyloxy group, and the like, but are not limited thereto.

In the present specification, the alkenyl group may be straight-chained or branched, and the number of carbon atoms thereof is not particularly limited, but is preferably 2 to 30. Specific examples thereof include a vinyl group, a 1-propenyl group, an isopropenyl group, a 1-butenyl group, a 2-butenyl group, a 3-butenyl group, a 1-pentenyl group, a 2-pentenyl group, a 3-pentenyl group, a 3-methyl-1-butenyl group, a 1,3-butadienyl group, an allyl group, a 1-phenylvinyl-1-yl group, a 2-phenylvinyl-1-yl group, a 2,2-diphenylvinyl-1-yl group, a 2-phenyl-2-(naphthyl-1-yl)vinyl-1-yl group, a 2,2-bis(diphenyl-1-yl)vinyl-1-yl group, a stilbenyl group, a styrenyl group, and the like, but are not limited thereto.

In the present specification, the aryl group is not particularly limited, but has preferably 6 to 30 carbon atoms, and the aryl group may be monocyclic or polycyclic.

When the aryl group is a monocyclic aryl group, the number of carbon atoms thereof is not particularly limited, but is preferably 6 to 50. Specific examples of the monocyclic aryl group include a phenyl group, a biphenyl group, a terphenyl group, and the like, but are not limited thereto.

When the aryl group is a polycyclic aryl group, the number of carbon atoms thereof is not particularly limited, but is preferably 10 to 50. Specific examples of the polycyclic aryl group include a naphthyl group, an anthracene group, a phenanthrene group, a triphenylene group, a pyrene group, a phenalene group, a perylene group, a chrysene group, a fluorene group, and the like, but are not limited thereto.

In the present specification, the fluorene group may be substituted, and adjacent groups may be bonded to each other to form a ring.

Examples of the case where the fluorene group is substituted include

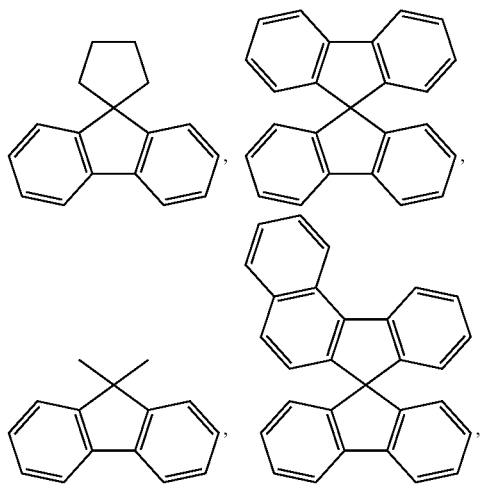

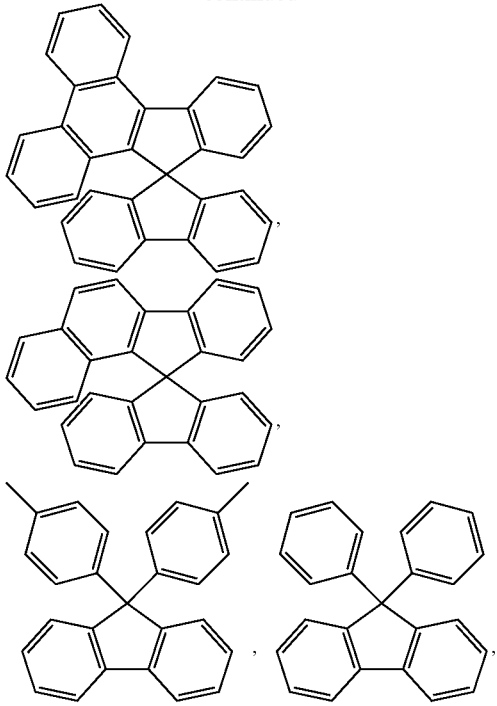

and the like, but are not limited thereto.

In the present specification, the "adjacent" group may mean a substituent substituted with an atom directly linked to an atom in which the corresponding substituent is substituted, a substituent disposed to be sterically closest to the corresponding substituent, or another substituent substituted with an atom in which the corresponding substituent is substituted. For example, two substituents substituted at the ortho position in a benzene ring and two substituents substituted with the same carbon in an aliphatic ring may be interpreted as groups which are "adjacent" to each other.

In the present specification, the heteroaryl group includes one or more atoms other than carbon, that is, one or more heteroatoms, and specifically, the heteroatom may include one or more atoms selected from the group consisting of O, N, Se, S, and the like. The number of carbon atoms thereof is not particularly limited, but is preferably 2 to 30, and the heteroaryl group may be monocyclic or polycyclic. Examples of the heteroaryl group include a thiophene group, a furan group, a pyrrole group, an imidazole group, a thiazole group, an oxazole group, an oxadiazole group, a pyridine group, a bipyridine group, a pyrimidine group, a triazine group, a triazole group, an acridine group, a pyridazine group, a pyrazine group, a quinoline group, a quinazoline group, a quinoxaline group, a phthalazine group, a pyridopyrimidine group, a pyridopyrazine group, a pyrazinopyrazine group, an isoquinoline group, an indole group, a carbazole group, a benzoxazole group, a benzimidazole group, a benzothiazole group, a benzocarbazole group, a benzothiophene group, a dibenzothiophene group, a benzofuran group, a phenanthridine group, a phenanthroline group, an isoxazole group, a thiadiazole group, a dibenzofuran group, a dibenzosilole group, a phenoxathiin group, a phenoxazine group, a phenothiazine group, a dihydroindenocarbazole group, a spirofluorenexanthene group, a spirofluorenethioxanthene group, a tetrahydronaphthothiophene group, a tetrahydronaphthofuran group, a tetrahydrobenzothiophene group, a tetrahydrobenzofuran group, and the like, but are not limited thereto.

In the present specification, the silyl group may be an alkylsilyl group, an arylsilyl group, an alkylarylsilyl group, a heteroarylsilyl group, and the like. The above-described examples of the alkyl group may be applied to the alkyl group in the alkylsilyl group, the above-described examples of the aryl group may be applied to the aryl group in the arylsilyl group, the examples of the alkyl group and the aryl group may be applied to the alkyl group and the aryl group in the alkylarylsilyl group, and the examples of the heterocyclic group may be applied to the heteroaryl group in the heteroarylsilyl group.

In the present specification, the hydrocarbon ring group may be an aromatic hydrocarbon ring group, an aliphatic hydrocarbon ring group, or a condensed ring group of an aromatic hydrocarbon ring and an aliphatic hydrocarbon ring and may be selected among examples of the cycloalkyl group, the aryl group, and a combination thereof, and examples of the hydrocarbon ring group include a phenyl group, a cyclohexyl group, an adamantyl group, a bicylo [2.2.1]heptyl group, a bicyclo[2.2.1]octyl group, a tetrahydronaphthalene group, a tetrahydroanthracene group, a 1,2,3,4-tetrahydro-1,4-methanonaphthalene group, a 1,2,3,4-tetrahydro-1,4-ethanonaphthalene group, a spirocyclopenthanefluorene group, a spiroadamantanefluorene group, a spirocyclohexanefluorene group, and the like, but are not limited thereto.

In the present specification, the heterocyclic group includes one or more atoms other than carbon, that is, one or more heteroatoms, and specifically, the heteroatom may include one or more atoms selected from the group consisting of O, N, Se, S, and the like. The heterocyclic group may be monocyclic or polycyclic, and may be an aromatic heterocyclic group; an aliphatic heterocyclic group; a condensed ring group of an aromatic hetero ring and an aliphatic hetero ring; a condensed ring group of an aliphatic hydrocarbon ring, an aromatic hydrocarbon ring and an aromatic hetero ring, or a condensed ring group of an aliphatic hydrocarbon ring, an aromatic hydrocarbon ring and an aliphatic hetero ring, and the aromatic heterocyclic group may be selected among the examples of the heteroaryl group.

In the present specification, the aliphatic heterocyclic group means an aliphatic ring group including one or more of hetero atoms. An aliphatic heterocyclic group includes all of a single-bonded aliphatic ring group, an aliphatic ring group including a multiple bond, or an aliphatic ring group in a form in which a ring including a single bond and a multiple bond is condensed. Examples of the aliphatic hetero ring include an epoxy group, an oxirane group, a tetrahydrofuran group, a 1,4-dioxane group, a pyrrolidine group, a piperidine group, a morpholine group, an oxepane group, an azocane group, a thiocane group, a tetrahydronaphthothiophene group, a tetrahydronaphthofuran group, a tetrahydrobenzothiophene group, a tetrahydrobenzofuran group, and the like, but are not limited thereto.

In the present specification, the aryloxy group may be represented by —ORo, and the description on the above-described aryl group is applied to Ro.

In the present specification, the arylthio group may be represented by —SRs1, and the description on the above-described aryl group is applied to Rs1.

In the present specification, the alkylthio group may be represented by —SRs2, and the description on the above-described alkyl group is applied to Rs2.

In the present specification, the alkylene group means a group having two bonding positions in an alkyl group, that is, a divalent group. The above-described description on the alkyl group may be applied to the alkylene group, except for a divalent alkylene group.

In the present specification, the cycloalkylene group means a group having two bonding positions in a cycloalkyl group, that is, a divalent group. The above-described description on the cycloalkyl group may be applied to the cycloalkylene groups, except for a divalent cycloalkylene group.

In the present specification, the condensed ring group of the divalent aromatic hydrocarbon ring and the aliphatic hydrocarbon ring means a group having two bonding positions in the condensed ring group of the aromatic hydrocarbon ring and the aliphatic hydrocarbon ring, that is, a divalent group. The above-described description on the condensed ring group of the aromatic hydrocarbon ring and the aliphatic hydrocarbon ring may be applied, except that the groups are each a divalent group.

In the present specification, the arylene group means a group having two bonding positions in an aryl group, that is, a divalent group. The above-described description on the aryl group may be applied to the arylene group, except for a divalent arylene group.

Hereinafter, preferred exemplary embodiments of the present disclosure will be described in detail. However, the exemplary embodiments of the present disclosure may be modified into various other forms, and the scope of the present disclosure is not limited to the exemplary embodiments which will be described below.

Formula 1 is a phenylene group. Further, when Ar1 and Ar2 are a substituent rich in electrons such as a substituted or unsubstituted aryl group; or a substituted or unsubstituted heteroaryl group, the refractive index of the resin may be further improved by increasing the electron density of the structure represented by Chemical Formula 1. Therefore, the resin according to an exemplary embodiment of the present disclosure has a high refractive index and high transparency, and an optical lens, an optical film, or an optical resin using the resin has a small thickness and may exhibit excellent optical characteristics.

In addition, the resin has a technical effect of improving the heat resistance of the resin by further including the unit represented by Chemical Formula 2. Furthermore, the glass transition temperature (Tg) of the resin may be complemented or the chain behavior of the resin may be made flexible, and there is a technical effect advantageous in the injection processing of a molded article.

According to an exemplary embodiment of the present disclosure, the resin is a polyester resin, or a polyester-carbonate resin.

According to an exemplary embodiment of the present disclosure, Chemical Formula 1 is the following Chemical Formula 1-1 or 1-2.

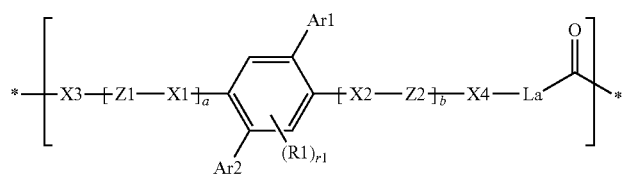

[Chemical Formula 1-1]

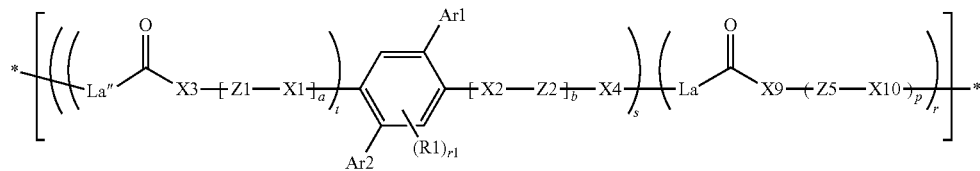

[Chemical Formula 1-2]

According to an exemplary embodiment of the present disclosure, one or more of the unit of Chemical Formula 1 can be included in the resin, and when two or more are included, the units are the same as or different from each other.

According to an exemplary embodiment of the present disclosure, one or more of the unit of Chemical Formula 2 can be included in the resin, and when two or more are included, the units are the same as or different from each other.

An exemplary embodiment of the present disclosure provides a resin including the unit of Chemical Formula 1 and the unit of Chemical Formula 2.

From the relationship formula between the molecular structure and the refractive index, which is known by the Lorentz-Lorenz's formula, it can be seen that the refractive index of a material composed of molecules is increased by increasing the electron density of the molecule and reducing the molecular volume.

The resin including the unit represented by Chemical Formula 1 has a small molecular volume and is excellent in the ability to pack, and thus may improve the refractive index of the resin because the core structure of Chemical In Chemical Formula 1-1,
the definitions of *, Ar1, Ar2, R1, r1, X1 to X4, Z1, Z2, a and b are the same as those defined in Chemical Formula 1,
La is —C(=O)-L-,
L is a substituted or unsubstituted arylene group,
in Chemical Formula 1-2,
the definitions of *, Ar1, Ar2, R1, r1, X1 to X4, X9, X10, Z1, Z2, Z5, a, b, t and p are the same as those defined in Chemical Formula 1,
La and La" are the same as or different from each other, and are each independently a direct bond; or —C(=O)-L-,
L is a substituted or unsubstituted arylene group,
r is a real number of 0<r<1 as a mole fraction,
s is a real number of 0<s<1 as a mole fraction, and
r+s=1.

According to an exemplary embodiment of the present disclosure, Chemical Formula 1 is Chemical Formula 1-1.

According to an exemplary embodiment of the present disclosure, Chemical Formula 1 is Chemical Formula 1-2.

According to an exemplary embodiment of the present disclosure, Chemical Formula 2 is the following Chemical Formula 2-1 or 2-2.

[Chemical Formula 2-1]

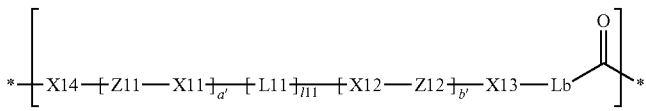

[Chemical Formula 2-2]

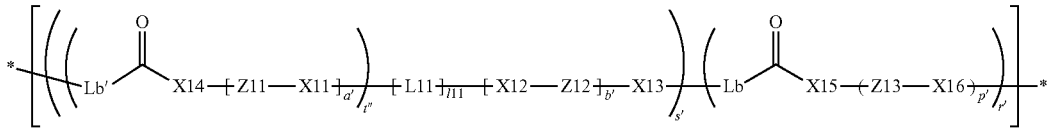

In Chemical Formula 2-1,
*, L11, l11, X11 to X14, Z11, Z12, a' and b' are the same as those defined in Chemical Formula 2,
Lb is —C(=O)-L'-,
L' is a substituted or unsubstituted arylene group, and
wherein, in Chemical Formula 2-2,
the definitions of *, L11, l11, X11 to X16, Z11, Z12, Z13, a', b', t'' and p' are the same as those defined in Chemical Formula 2,
Lb and Lb' are the same as or different from each other, and are each independently a direct bond; or —C(=O)-L'-,
L' is a substituted or unsubstituted arylene group,
r' is a real number of 0<r'<1 as a mole fraction,
s' is a real number of 0<s'<1 as a mole fraction, and
r'+s'=1.

According to an exemplary embodiment of the present disclosure, Chemical Formula 2 is Chemical Formula 2-1.

According to an exemplary embodiment of the present disclosure, Chemical Formula 2 is the following Chemical Formula 2-1-1.

[Chemical Formula 2-1-1]

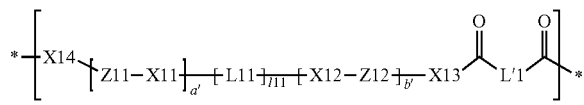

In Chemical Formula 2-1-1,
the definitions of *, L11, l11, X11 to X14, Z11, Z12, a' and b' are the same as those defined in Chemical Formula 2, and
L'1 is a substituted or unsubstituted arylene group.

According to an exemplary embodiment of the present disclosure, Chemical Formula 2 is the following Chemical Formula 2-3.

[Chemical Formula 2-3]

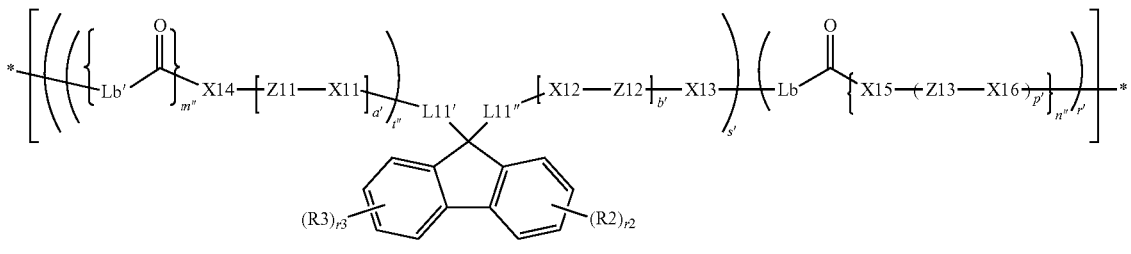

According to an exemplary embodiment of the present disclosure, Chemical Formula 2 is Chemical Formula 2-2.

According to an exemplary embodiment of the present disclosure, Chemical Formula 1 is the following Chemical Formula 1-1-1.

[Chemical Formula 1-1-1]

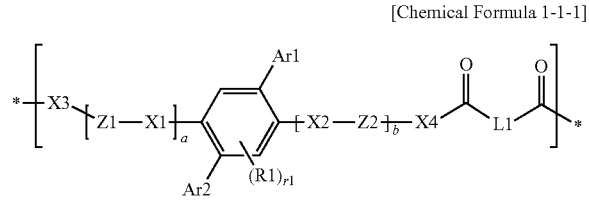

In Chemical Formula 1-1-1,
the definitions of *, Ar1, Ar2, R1, r1, X1 to X4, Z1, Z2, a and b are the same as those defined in Chemical Formula 1, and
L1 is a substituted or unsubstituted arylene group.

In Chemical Formula 2-3,
the definitions of *, X11 to X16, Z11 to Z13, Lb, Lb', a', b', m'', n'', t'', s' and r' are the same as those defined in Chemical Formula 2,
R2 and R3 are the same as or different from each other, and are each independently hydrogen; or a substituted or unsubstituted alkyl group,
r2 and r3 are each an integer from 1 to 4, and when r2 is 2 or higher, two or more R2's are the same as or different from each other, and when r3 is 2 or higher, two or more R3's are the same as or different from each other, and
L11' and L11'' are the same as or different from each other, and are each independently a substituted or unsubstituted arylene group; or a heteroarylene group.

According to an exemplary embodiment of the present disclosure, Chemical Formula 1 is any one of the following Chemical Formulae 1-2-1 to 1-2-4.

[Chemical Formula 1-2-1]

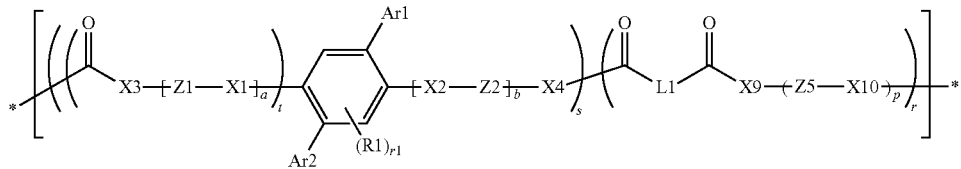

[Chemical Formula 1-2-2]

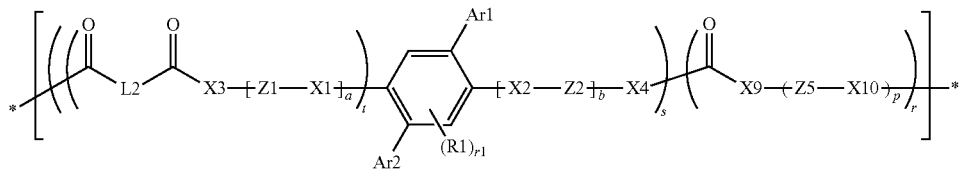

[Chemical Formula 1-2-3]

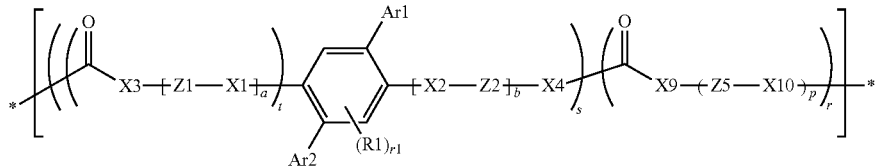

[Chemical Formula 1-2-4]

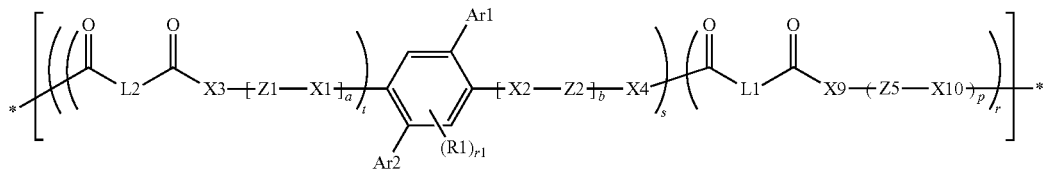

In Chemical Formulae 1-2-1 to 1-2-4,
the definitions of *, Ar1, Ar2, R1, r1, X1 to X4, X9, X10, Z1, Z2, Z5, a, b, p, t, s and r are the same as those defined in Chemical Formula 1-2, and
L1 and L2 are the same as or different from each other, and are each independently a substituted or unsubstituted arylene group.

According to an exemplary embodiment of the present disclosure, Chemical Formula 2 is any one of the following Chemical Formulae 2-2-1 to 2-2-4.

[Chemical Formula 2-2-1]

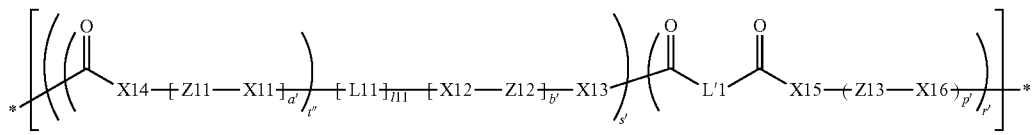

[Chemical Formula 2-2-2]

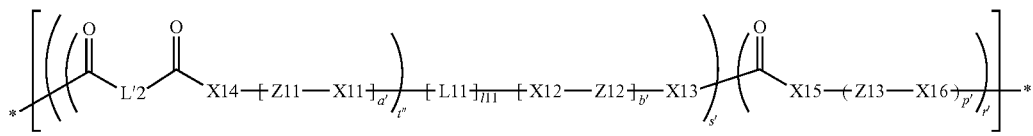

[Chemical Formula 2-2-3]

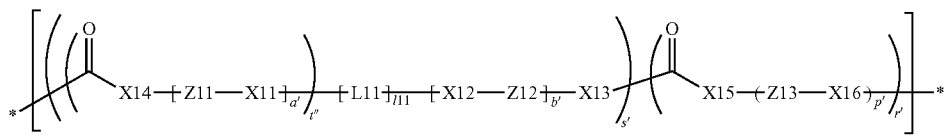

[Chemical Formula 2-2-4]

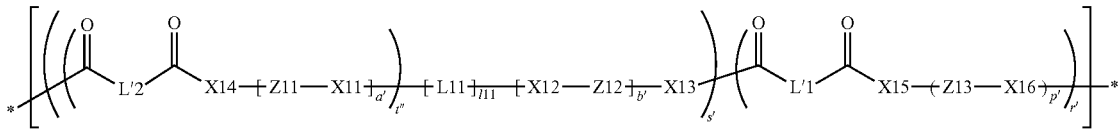

In Chemical Formulae 2-2-1 to 2-2-4,
the definitions of *, L11, l11, X11 to X16, Z11 to Z13, a', b', s', r', t" and p' are the same as those defined in Chemical Formula 2-2, and L'1 and L'2 are the same as or different from each other, and are each independently a substituted or unsubstituted arylene group.

According to an exemplary embodiment of the present disclosure, Chemical Formula 2 is the following Chemical Formula 2-3-1 or 2-3-2.

[Chemical Formula 2-3-1]

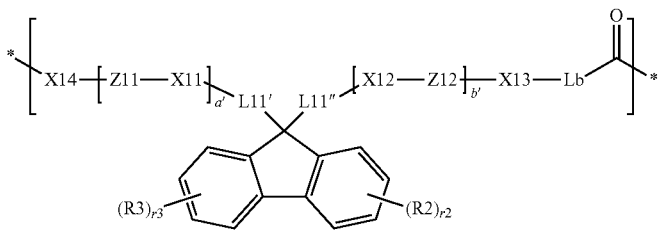

[Chemical Formula 2-3-1-1]

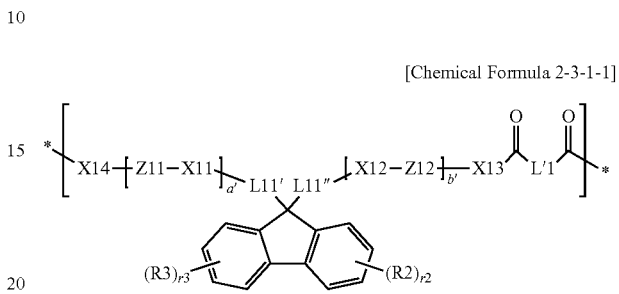

[Chemical Formula 2-3-2]

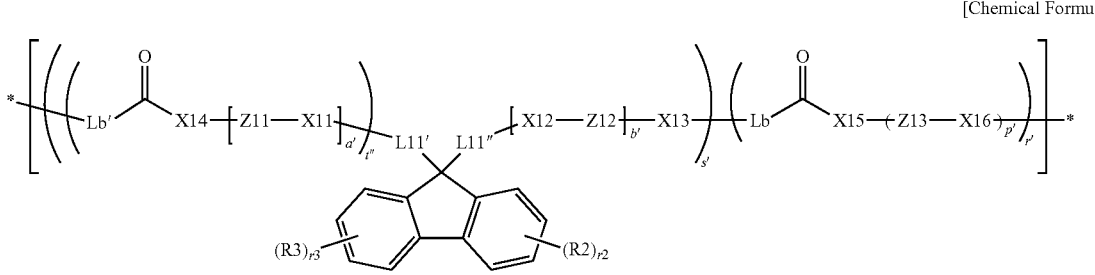

In Chemical Formulae 2-3-1 and 2-3-2,
the definitions of *, X11 to X16, Z11 to Z13, Lb, Lb', a', b', m", n", t", s' and r' are the same as those defined in Chemical Formula 2, R2 and R3 are the same as or different from each other, and are each independently hydrogen; or a substituted or unsubstituted alkyl group, r2 and r3 are each an integer from 1 to 4, and when r2 is 2 or higher, two or more R2's are the same as or different from each other, and when r3 is 2 or higher, two or more R3's are the same as or different from each other, and L11' and L11" are the same as or different from each other, and are each independently a substituted or unsubstituted arylene group; or a heteroarylene group.

According to an exemplary embodiment of the present disclosure, Chemical Formula 2 is the following Chemical Formula 2-3-1-1.

In Chemical Formula 2-3-1-1,
the definitions of *, X11 to X14, Z11 to Z13, a' and b' are the same as those defined in Chemical Formula 2-3-1, R2 and R3 are the same as or different from each other, and are each independently hydrogen; or a substituted or unsubstituted alkyl group, r2 and r3 are each an integer from 1 to 4, and when r2 is 2 or higher, two or more R2's are the same as or different from each other, and when r3 is 2 or higher, two or more R3's are the same as or different from each other, L11' and L11" are the same as or different from each other, and are each independently a substituted or unsubstituted arylene group; or a heteroarylene group, and L'1 is a substituted or unsubstituted arylene group.

According to an exemplary embodiment of the present disclosure, Chemical Formula 2 is any one of the following Chemical Formulae 2-3-2-1 to 2-3-2-4.

[Chemical Formula 2-3-2-1]

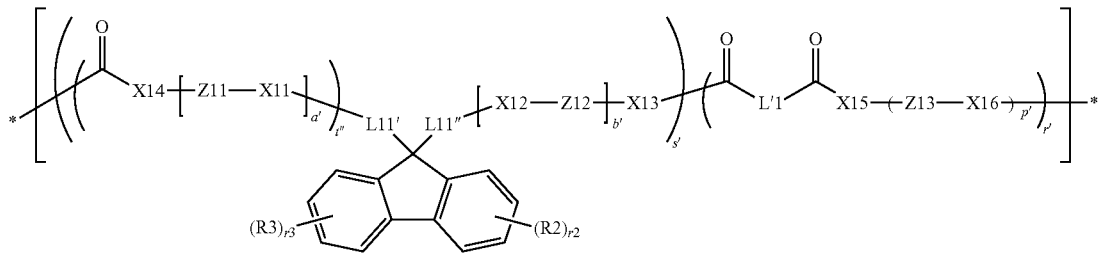

[Chemical Formula 2-3-2-2]

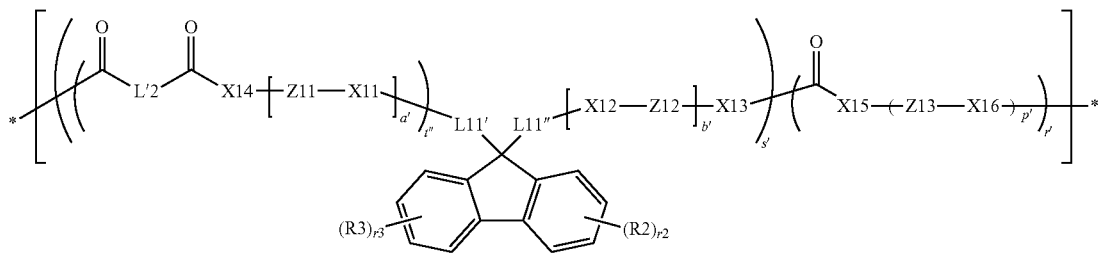

[Chemical Formula 2-3-2-3]

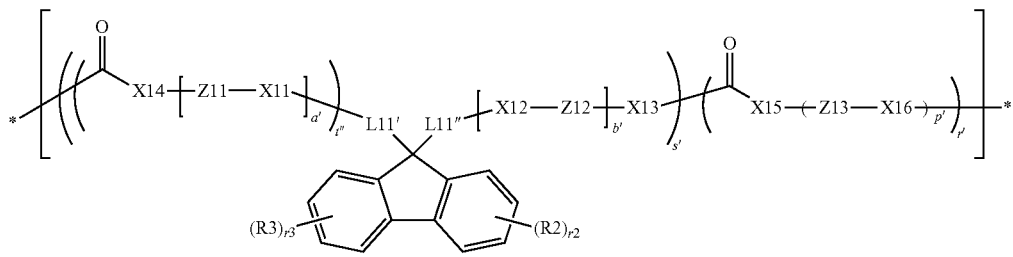

[Chemical Formula 2-3-2-4]

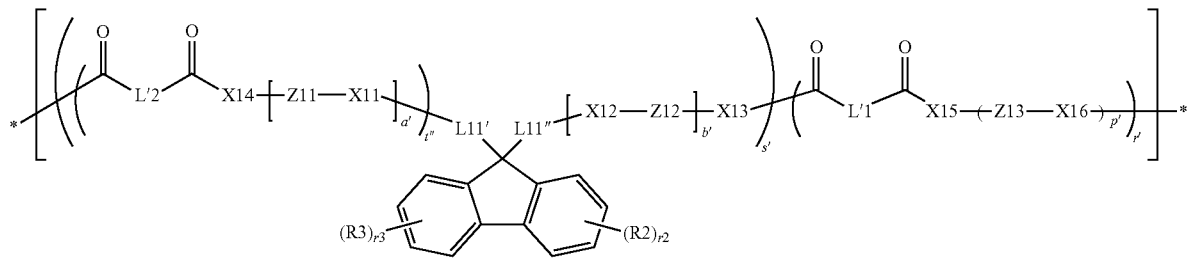

In Chemical Formulae 2-3-2-1 to 2-3-2-4,

\*, R2, R3, r2, r3, L1, L2, X11 to X16, Z11 to Z13, a', b', t", s', r' and p' are the same as those defined in Chemical Formula 2-3-2, and L'1 and L'2 are the same as or different from each other, and are each independently a substituted or unsubstituted arylene group.

In an exemplary embodiment of the present disclosure, Chemical Formula 2 is the following Chemical Formula 3. The resin further includes a unit of the following Chemical Formula 3.

[Chemical Formula 3]

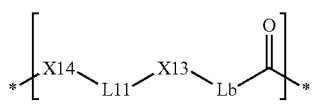

In Chemical Formula 3,

X13 and X14 are the same as or different from each other, and are each independently O; or S, Lb is —C(=O)-L'-, L' is a substituted or unsubstituted arylene group, L11 is a substituted or unsubstituted alkylene group, and \* means a moiety linked to the main chain of the resin.

The resin has a technical effect of improving flowability during resin processing by further including the unit represented by Chemical Formula 3, as the flexibility of the chain forming the main chain of the resin is increased.

According to an exemplary embodiment of the present disclosure, Ar1 and Ar2 are the same as or different from each other, and are each independently a monocyclic or polycyclic aryl group having 6 to 30 carbon atoms, which is unsubstituted or substituted with a monocyclic or polycyclic aryl group having 6 to 30 carbon atoms or a monocyclic or polycyclic heteroaryl group having 2 to 30 carbon atoms; or a monocyclic or polycyclic heteroaryl group having 2 to 30 carbon atoms, which is unsubstituted or substituted with a monocyclic or polycyclic aryl group having 6 to 30 carbon atoms, R1 is hydrogen, X1 to X4, X9 and X10 are O, Z1, Z2 and Z5 are the same as or different from each other, and are each independently a straight-chained or branched alkylene group having 1 to 30 carbon atoms, and La is a monocyclic or polycyclic arylene group having 6 to 30 carbon atoms.

According to an exemplary embodiment of the present disclosure, R2 and R3 are different from each other, and are each independently hydrogen; or an unsubstituted monocyclic or polycyclic aryl group having 6 to 30 carbon atoms, L11' and L11" are the same as or different from each other, and are each independently a monocyclic or polycyclic arylene group having 6 to 30 carbon atoms, X5 to X8, X'9 and X'10 are O, Z3, Z4 and Z6 are the same as or different from each other, and are each independently a straight-chained or branched alkylene group having 1 to 30 carbon atoms, and La' is a monocyclic or polycyclic arylene group having 6 to 30 carbon atoms.

According to an exemplary embodiment of the present disclosure, Ar1 and Ar2 are the same as or different from each other, and are each independently a monocyclic or polycyclic aryl group having 6 to 30 carbon atoms.

According to an exemplary embodiment of the present disclosure, Ar1 and Ar2 are the same as or different from each other, and are each independently a monocyclic or polycyclic aryl group having 6 to 20 carbon atoms.

According to an exemplary embodiment of the present disclosure, Ar1 and Ar2 are the same as or different from each other, and are each independently a polycyclic aryl group having 10 to 30 carbon atoms.

According to an exemplary embodiment of the present disclosure, Ar1 and Ar2 are the same as or different from each other, and are each independently a polycyclic aryl group having 10 to 20 carbon atoms.

According to an exemplary embodiment of the present disclosure, Ar1 and Ar2 are a naphthyl group.

According to an exemplary embodiment of the present disclosure, R1 is hydrogen.

According to an exemplary embodiment of the present disclosure, X1 is O.

According to an exemplary embodiment of the present disclosure, X2 is O.

According to an exemplary embodiment of the present disclosure, X3 is O.

According to an exemplary embodiment of the present disclosure, X4 is O.

According to an exemplary embodiment of the present disclosure, X9 is O.

According to an exemplary embodiment of the present disclosure, X10 is O.

According to an exemplary embodiment of the present disclosure, Z1, Z2 and Z5 are the same as or different from each other, and are each independently a straight-chained or branched alkylene group having 1 to 30 carbon atoms.

According to an exemplary embodiment of the present disclosure, Z1, Z2 and Z5 are the same as or different from each other, and are each independently a straight-chained or branched alkylene group having 1 to 20 carbon atoms.

According to an exemplary embodiment of the present disclosure, Z1, Z2 and Z5 are the same as or different from each other, and are each independently an ethylene group; or an isopropylene group.

According to an exemplary embodiment of the present disclosure, La and La" are the same as or different from each other, and are each independently a direct bond; or —C(=O)-L-.

According to an exemplary embodiment of the present disclosure, La and La" are different from each other, and are each independently a direct bond; or —C(=O)-L-.

According to an exemplary embodiment of the present disclosure, La and La" are a direct bond.

According to an exemplary embodiment of the present disclosure, La and La" are —C(=O)-L-.

According to an exemplary embodiment of the present disclosure, La" is a direct bond, and La is —C(=O)-L-.

According to an exemplary embodiment of the present disclosure, La is a direct bond, and La" is —C(=O)-L-.

According to an exemplary embodiment of the present disclosure, L is a monocyclic or polycyclic arylene group having 6 to 30 carbon atoms.

According to an exemplary embodiment of the present disclosure, L is a monocyclic or polycyclic arylene group having 6 to 20 carbon atoms.

According to an exemplary embodiment of the present disclosure, L is a phenylene group; or a naphthylene group.

According to an exemplary embodiment of the present disclosure, L1 and L2 are the same as or different from each other, and are each independently a monocyclic or polycyclic arylene group having 6 to 30 carbon atoms, which is unsubstituted or substituted with a straight-chained or branched alkyl group having 1 to 30 carbon atoms, or a monocyclic or polycyclic aryl group having 6 to 30 carbon atoms.

According to an exemplary embodiment of the present disclosure, L1 and L2 are the same as or different from each other, and are each independently a monocyclic or polycyclic arylene group having 6 to 20 carbon atoms, which is unsubstituted or substituted with a straight-chained or branched alkyl group having 1 to 20 carbon atoms, or a monocyclic or polycyclic aryl group having 6 to 20 carbon atoms.

According to an exemplary embodiment of the present disclosure, L1 and L2 are the same as or different from each other, and are each independently a phenylene group which is unsubstituted or substituted with a methyl group, or a phenyl group; or a naphthylene group.

According to an exemplary embodiment of the present disclosure, R2 and R3 is hydrogen.

According to an exemplary embodiment of the present disclosure, L11 is a monocyclic or polycyclic alkylene group having 1 to 30 carbon atoms; a condensed ring group of a divalent monocyclic or polycyclic aromatic hydrocarbon ring having 6 to 30 carbon atoms and an aliphatic hydrocarbon ring having 3 to 30 carbon atoms; or a monocyclic or polycyclic arylene group having 6 to 50 carbon atoms, which is unsubstituted with or substituted with a straight-chained or branched alkyl group having 1 to 30 carbon atoms or a monocyclic or polycyclic aryl group having 6 to 30 carbon atoms.

According to an exemplary embodiment of the present disclosure, L11 is a monocyclic or polycyclic alkylene group having 1 to 20 carbon atoms; a condensed ring group of a divalent monocyclic or polycyclic aromatic hydrocarbon ring having 6 to 20 carbon atoms and an aliphatic hydrocarbon ring having 3 to 20 carbon atoms; or a monocyclic or polycyclic arylene group having 6 to 30 carbon atoms, which is unsubstituted with or substituted with a straight-chained or branched alkyl group having 1 to 20 carbon atoms or a monocyclic or polycyclic aryl group having 6 to 20 carbon atoms.

According to an exemplary embodiment of the present disclosure, L11 is a methylene group which is unsubstituted or substituted with a methyl group; an isopropylene group;

a phenylene group which is unsubstituted or substituted with a methyl group or a phenyl group; a divalent naphthalene group; or a divalent fluorene group.

According to an exemplary embodiment of the present disclosure, l11 is 1.

According to an exemplary embodiment of the present disclosure, l11 is 2, and two L11's are the same as or different from each other.

According to an exemplary embodiment of the present disclosure, l11 is 3, and three L11's are the same as or different from each other.

According to an exemplary embodiment of the present disclosure, X11 is O.

According to an exemplary embodiment of the present disclosure, X12 is O.

According to an exemplary embodiment of the present disclosure, X13 is O.

According to an exemplary embodiment of the present disclosure, X14 is O.

According to an exemplary embodiment of the present disclosure, X15 is O.

According to an exemplary embodiment of the present disclosure, X16 is O.

According to an exemplary embodiment of the present disclosure, Z11 to Z13 are the same as or different from each other, and are each independently a straight-chained or branched alkylene group having 1 to 30 carbon atoms.

According to an exemplary embodiment of the present disclosure, Z11 to Z13 are the same as or different from each other, and are each independently a straight-chained or branched alkylene group having 1 to 20 carbon atoms.

According to an exemplary embodiment of the present disclosure, Z11 to Z13 are an ethylene group.

According to an exemplary embodiment of the present disclosure, Lb and Lb' are the same as or different from each other, and are each independently a direct bond; or —C(=O)-L'-.

According to an exemplary embodiment of the present disclosure, Lb and Lb' are different from each other, and are each independently a direct bond; or —C(=O)-L'-.

According to an exemplary embodiment of the present disclosure, Lb and Lb' are a direct bond.

According to an exemplary embodiment of the present disclosure, Lb and Lb' are —C(=O)-L'-.

According to an exemplary embodiment of the present disclosure, Lb' is a direct bond, and Lb is —C(=O)-L'-.

According to an exemplary embodiment of the present disclosure, Lb is a direct bond, and Lb' is —C(=O)-L'-.

According to an exemplary embodiment of the present disclosure, L' is a monocyclic or polycyclic arylene group having 6 to 30 carbon atoms.

According to an exemplary embodiment of the present disclosure, L' is a monocyclic or polycyclic arylene group having 6 to 20 carbon atoms.

According to an exemplary embodiment of the present disclosure, L' is a phenylene group; or a naphthylene group.

According to an exemplary embodiment of the present disclosure, L'1 and L'2 are the same as or different from each other, and are each independently a monocyclic or polycyclic arylene group having 6 to 30 carbon atoms.

According to an exemplary embodiment of the present disclosure, L'1 and L'2 are the same as or different from each other, and are each independently a monocyclic or polycyclic arylene group having 6 to 20 carbon atoms.

According to an exemplary embodiment of the present disclosure, L'1 and L'2 are the same as or different from each other, and are each independently a phenylene group; or a naphthylene group.

According to an exemplary embodiment of the present disclosure, a' is 1.

According to an exemplary embodiment of the present disclosure, b' is 1.

According to an exemplary embodiment of the present disclosure, a' is 0.

According to an exemplary embodiment of the present disclosure, b' is 0.

According to an exemplary embodiment of the present disclosure, p' is 0.

According to an exemplary embodiment of the present disclosure, p' is 1.

In an exemplary embodiment of the present disclosure, X13 and X14 are O.

In an exemplary embodiment of the present disclosure, X13 and X14 are S.

In an exemplary embodiment of the present disclosure, L11 is a substituted or unsubstituted alkylene group having 1 to 30 carbon atoms.

In an exemplary embodiment of the present disclosure, L11 is a substituted or unsubstituted alkylene group having 1 to 20 carbon atoms.

In an exemplary embodiment of the present disclosure, L11 is a substituted or unsubstituted alkylene group having 1 to 10 carbon atoms.

In an exemplary embodiment of the present disclosure, L11 is a substituted or unsubstituted ethylene group.

In an exemplary embodiment of the present disclosure, L11 is an ethylene group.

In an exemplary embodiment of the present disclosure, the definitions of L11' and L11" are the same as the definition of L11.

According to an exemplary embodiment of the present disclosure, the resin may have —OH; —SH; —CO$_2$CH$_3$; —Cl; or —OC$_6$H$_5$ as both end groups.

In an exemplary embodiment of the present disclosure, in Chemical Formula 1, r is 0.001 to 0.999 as a mole fraction, s is 0.001 to 0.999 as a mole fraction, preferably, r is 0.01 to 0.99 and s is 0.01 to 0.99, and more preferably, r is 0.1 to 0.9 and s is 0.1 to 0.9.

When r and s of Chemical Formula 1 are within the above ranges, a resin having desired physical properties may be obtained by appropriately adjusting r and s, which are the mole fractions.

In an exemplary embodiment of the present disclosure, in Chemical Formula 2, r' is 0.001 to 0.999 as a mole fraction, s' is 0.001 to 0.999 as a mole fraction, preferably, r' is 0.01 to 0.99 and s' is 0.01 to 0.99, and more preferably, r' is 0.1 to 0.9 and s' is 0.1 to 0.9.

When r' and s' of Chemical Formula 2 are within the above ranges, a resin having desired physical properties may be obtained by appropriately adjusting r' and s', which are the mole fractions.

In an exemplary embodiment of the present disclosure, the resin has a weight average molecular weight of 3,000 g/mol to 500,000 g/mol, preferably 5,000 g/mol to 300,000 g/mol, 7,000 g/mol to 250,000 g/mol, and 8,000 g/mol to 200,000 g/mol. The resin has a weight average molecular weight of more preferably 9,000 g/mol to 150,000 g/mol, 10,000 g/mol to 100,000 g/mol, 12,000 g/mol to 80,000 g/mol, and 13,000 g/mol to 70,000 g/mol.

In an exemplary embodiment of the present disclosure, the resin has a number average molecular weight of 2,000 g/mol to 300,000 g/mol, 3,000 g/mol to 200,000 g/mol, 4,000 g/mol to 150,000 g/mol, 4,500 g/mol to 100,000 g/mol, preferably 5,000 g/mol to 80,000 g/mol.

When the resin satisfies the above-described weight average molecular weight and number average molecular weight ranges, the resin may have optimum fluidity and processability.

In the present disclosure, the weight average molecular weights and number average molecular weights of the resin and the oligomer used in the preparation thereof may be measured by gel permeation chromatograph (GPC) using a polystyrene (PS) standard using Agilent 1200 series.

Specifically, the weight average molecular weights may be measured using an Agilent 1200 series device using a Polymer Laboratories PLgel MIX-B 300 mm length column, and in this case, the measurement temperature is 40° C., the used solvent is tetrahydrofuran (THF), and the flow rate is 1 mL/min. The sample of the resin or oligomer is each prepared at a concentration of 1.0 mg/1 mL, and then fed in an amount of 10 μL, and the weight average molecular weight or number average molecular weight value is induced using a calibration curve formed using a polystyrene standard. In this case, nine types of polystyrene standard products with a molecular weight (g/mol) of 2,000/10,000/30,000/70,000/200,000/700,000/2,000,000/4,000,000/10,000,000 are used.

In an exemplary embodiment of the present disclosure, the resin may have a glass transition temperature (Tg) of 90° C. to 200° C. The glass transition temperature may be preferably 100° C. to 190° C., 120° C. to 170° C., 130° C. to 160° C., 117° C. to 168° C., and 110° C. to 187° C. When the resin satisfies the above glass transition temperature range, the glass transition temperature is easily adjusted when a resin composition is prepared by mixing with a resin having excellent heat resistance and injectability and having a glass transition temperature different from the above-described range, so that the physical properties desired in the present disclosure may be satisfied.

The glass transition temperature (Tg) may be measured by a differential scanning calorimeter (DSC). Specifically, the glass transition temperature may be measured from a graph obtained by heating 5.5 mg to 8.5 mg of the resin sample to 270° C. under a nitrogen atmosphere, and then scanning the resin sample while heating the resin sample at a heating rate of 10° C./min during the second heating after cooling.

In an exemplary embodiment of the present disclosure, a refractive index of the resin, which is measured at a wavelength of 587 nm or 589 nm, is 1.50 to 1.75. The refractive index may be preferably 1.60 to 1.72, and more preferably 1.646 to 1.695, or 1.611 to 1.695. When the resin satisfies the above refractive index, a thin and light optical lens can be manufactured when the resin is applied to a molded article such as an optical lens.

In an exemplary embodiment of the present disclosure, the Abbe's Number of the resin, which is measured and calculated at a wavelength of 589 nm (or 587 nm), 486 nm, and 656 nm may be 5 to 45. The Abbe's Number may be preferably 10 to 25, and more preferably 15.1 to 22.3, or 15.1 to 25.8. When the resin satisfies the above Abbe's Number range, there is an effect that the dispersion is decreased and the sharpness is increased when the resin is applied to a molded article such as an optical lens, while maintaining the high refractive index. The Abbe's Number may specifically be obtained by the following Equation by measuring the refractive index ($n_D$, $n_F$, and $n_C$) at a wavelength of D (589 nm or 587 nm), F (486 nm), and C (656 nm), respectively at 25° C.

Abbe's Number=$(n_D-1)/(n_F-n_C)$

The refractive index and the Abbe's Number may be measured from a film prepared by applying a solution prepared by dissolving the resin in a solvent to a silicon wafer by spin-coating, and may be measured by obtaining the result value according to the wavelength of light using an ellipsometer at 25° C. for the applied film. The solution may be applied by the spin-coating at a rotation speed of 150 rpm to 300 rpm, and the applied film may have a thickness of 5 μm to 20 μm. The silicon wafer is not particularly limited, and any silicon wafer that can measure the refractive index and the Abbe's Number of the resin composition according to the present disclosure may be appropriately adopted. The solvent may be dimethylacetamide or 1,2-dichlorobenzene, and the solution may be prepared by dissolving the resin sample in an amount of 10 wt % based on the total weight of the solution.

An exemplary embodiment of the present disclosure provides a method for preparing the resin, the method including: polymerizing a composition for preparing a resin, which includes a compound of the following Chemical Formula 1a; a compound of the following Chemical Formula 2a; and 1) a polyester precursor, or 2) a polyester precursor and a polycarbonate precursor.

[Chemical Formula 1a]

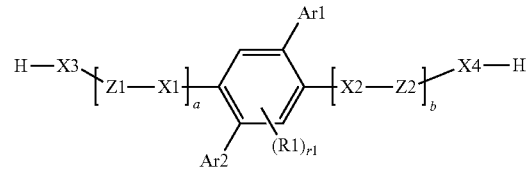

[Chemical Formula 2a]

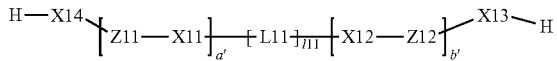

In Chemical Formulae 1a and 2a,
the definitions of Ar1, Ar2, R1, r1, X1 to X4, Z1, Z2, a and b are the same as those defined in Chemical Formula 1, and
L11, l11, X11 to X14, Z11, Z12, a' and b' are the same as those defined in Chemical Formula 2.

According to an exemplary embodiment of the present disclosure, Chemical Formula 2a is the following Chemical Formula 2a-1.

[Chemical Formula 2a-1]

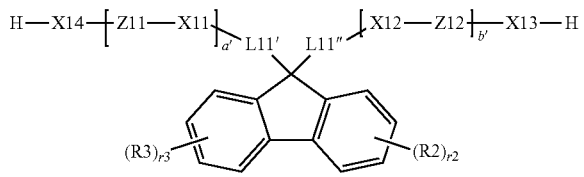

In Chemical Formula 2a-1,
the definitions of X11 to X14, Z11, Z12, a' and b' are the same as those defined in Chemical Formula 2, and
the definitions of R2, R3, r2, r3, L11' and L11" are the same as those defined in Chemical Formula 2-3.

In an exemplary embodiment of the present disclosure, Chemical Formula 3 is the following Chemical Formula 3a.

The composition for preparing a resin may further include a compound represented by the following Chemical Formula 3a.

[Chemical Formula 3a]

In Chemical Formula 3a, the definition of the substituent is the same as the definition in Chemical Formula 3.

An exemplary embodiment of the present disclosure provides a composition for preparing a resin, which includes the compound of Chemical Formula 1a; the compound of Chemical Formula 2a; and 1) a polyester precursor, or 2) a polyester precursor and a polycarbonate precursor.

According to an exemplary embodiment of the present disclosure, the method for preparing the resin further includes a compound of the following Chemical Formula 3a, and the compound of Chemical Formula 1a and the compound of Chemical Formula 2a are included in amounts of 0.01 mole % to 99.99 mole %: 99.99 mole % to 0.01 mole %. The compound of Chemical Formula 1a and the compound of Chemical Formula 2a are included in amounts of specifically 0.1 mole % to 99.9 mole %: 99.9 mole % to 0.1 mole %, 1 mole % to 99 mole %: 99 mole % to 1 mole %, 5 mole % to 90 mole %: 5 mole % to 90 mole %.

When Chemical Formulae 1a and 2a are included in the above contents, the compounds are easily polymerized, have a wide range of refractive indices or a high refractive index depending on the substituent, and have a wide range of glass transition temperatures.

The composition for preparing a resin may further include a solvent.

The solvent may be, for example, diphenyl ether, dimethylacetamide or methanol, but is not limited thereto, and any solvent applied in the art may be appropriately adopted.

The solvent may be included in an amount of 5 parts by weight to 60 parts by weight with respect to 100 parts by weight of the composition for preparing a resin.

The solvent may be included in an amount of preferably 5 parts by weight to 50 parts by weight, 7 parts by weight to 45 parts by weight or 8 parts by weight to 40 parts by weight with respect to 100 parts by weight of the composition for preparing a resin.

According to an exemplary embodiment of the present disclosure, it is possible to include two or more of Chemical Formula 1a. Two or more of Chemical Formula 1a are the same as or different from each other.

In an exemplary embodiment of the present disclosure, the compound of Chemical Formula 1a may be any one of the following compounds, but is not limited thereto.

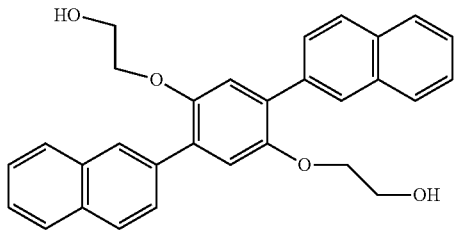

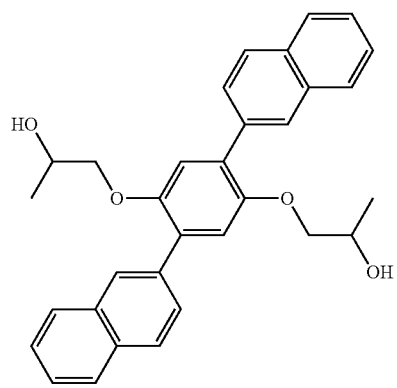

In an exemplary embodiment of the present disclosure, the compound of Chemical Formula 2a may be any one of the following compounds, but is not limited thereto.

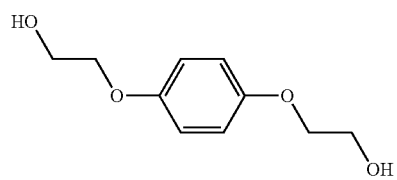

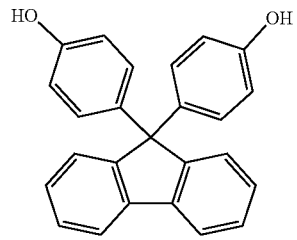

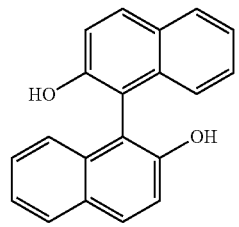

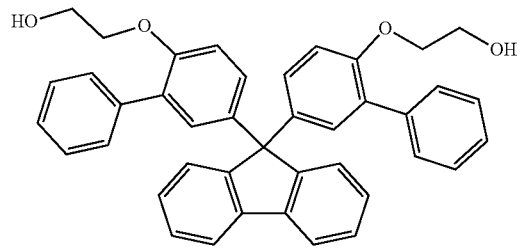

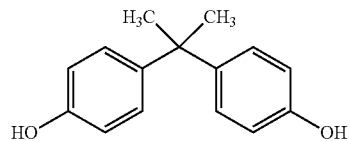

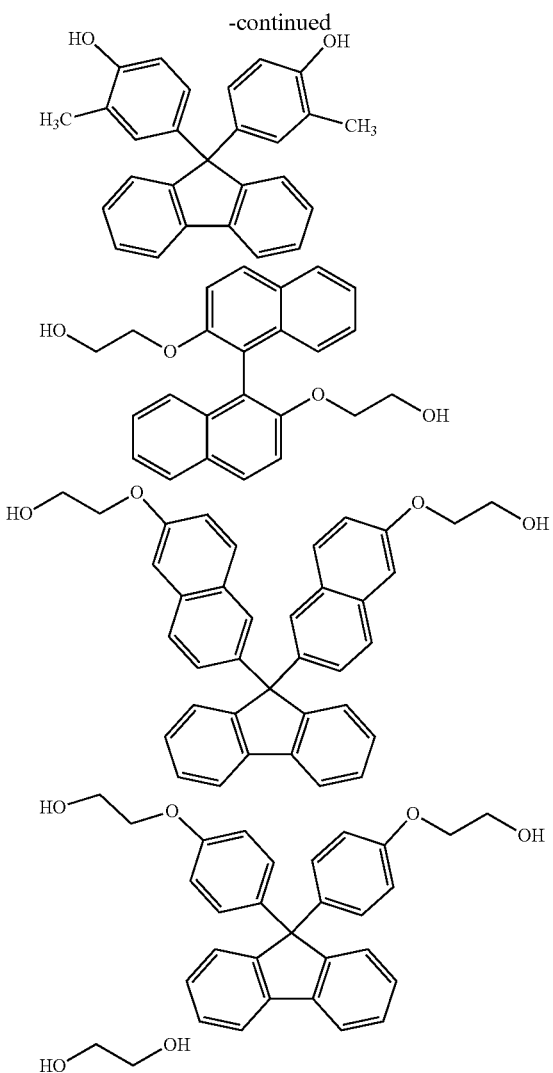

In an exemplary embodiment of the present disclosure, the compound of Chemical Formula 3a may be the following compound, but is not limited thereto.

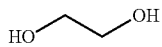

An exemplary embodiment of the present disclosure provides a method for preparing a resin, the method including: polymerizing a composition for preparing the resin, which preferably includes the compound of Chemical Formula 1a; and the compound of Chemical Formula 2a, and includes the polyester precursor.

In an exemplary embodiment of the present disclosure, the compound of Chemical Formula 1a may be included in an amount of 1 part by weight to 99 parts by weight with respect to 100 parts by weight of the composition for preparing a resin.

The compound of Chemical Formula 1a may be included in an amount of preferably 1 to 60 parts by weight, 1 to 50 parts by weight, 1 to 40 parts by weight, 1 to 30 parts by weight, 1 to 20 parts by weight or 1 to 10 parts by weight with respect to 100 parts by weight of the composition for preparing a resin.

In an exemplary embodiment of the present disclosure, the compound of Chemical Formula 2a may be included in an amount of 1 part by weight to 99 parts by weight with respect to 100 parts by weight of the composition for preparing a resin.

The compound of Chemical Formula 2a may be included in an amount of preferably 1 to 60 parts by weight, 1 to 50 parts by weight, 1 to 40 parts by weight, 1 to 30 parts by weight, 1 to 20 parts by weight or 1 to 10 parts by weight with respect to 100 parts by weight of the composition for preparing a resin.

In an exemplary embodiment of the present disclosure, the polyester precursor may be included in an amount of 1 part by weight to 150 parts by weight with respect to 100 parts by weight of the composition for preparing a resin.

The polyester precursor may be included in an amount of preferably 1 part by weight to 150 parts by weight, 1 to 140 parts by weight, 1 to 130 parts by weight, 1 to 125 parts by weight or 1 to 120 parts by weight with respect to 100 parts by weight of the composition for preparing a resin.

An exemplary embodiment of the present disclosure provides a method for preparing a resin, the method including: polymerizing a composition for preparing the resin, which preferably includes the compound of Chemical Formula 1a; and the compound of Chemical Formula 2a, and includes the polyester precursor and the polycarbonate precursor.

In an exemplary embodiment of the present disclosure, the compound of Chemical Formula 1a may be included in an amount of 1 part by weight to 99 parts by weight with respect to 100 parts by weight of the composition for preparing a resin.

The compound of Chemical Formula 1a may be included in an amount of preferably 1 to 60 parts by weight, 1 to 50 parts by weight, 1 to 40 parts by weight, 1 to 30 parts by weight, 1 to 20 parts by weight or 1 to 10 parts by weight with respect to 100 parts by weight of the composition for preparing a resin.

In an exemplary embodiment of the present disclosure, the compound of Chemical Formula 2a may be included in an amount of 1 part by weight to 99 parts by weight with respect to 100 parts by weight of the composition for preparing a resin.

The compound of Chemical Formula 2a may be included in an amount of preferably 1 to 60 parts by weight, 1 to 50 parts by weight, 1 to 40 parts by weight, 1 to 30 parts by weight, 1 to 20 parts by weight or 1 to 10 parts by weight with respect to 100 parts by weight of the composition for preparing a resin.

In an exemplary embodiment of the present disclosure, the polyester precursor may be included in an amount of 1 part by weight to 60 parts by weight with respect to 100 parts by weight of the composition for preparing a resin.

The polyester precursor may be included in an amount of preferably 1 part by weight to 60 parts by weight, 1 to 55 parts by weight, 1 to 50 parts by weight, 1 to 45 parts by weight or 1 to 40 parts by weight with respect to 100 parts by weight of the composition for preparing a resin.

In an exemplary embodiment of the present disclosure, the polycarbonate precursor may be included in an amount of 1 part by weight to 60 parts by weight with respect to 100 parts by weight of the composition for preparing a resin.

The polycarbonate precursor may be included in an amount of preferably 1 to 60 parts by weight, 1 to 55 parts by weight, 1 to 50 parts by weight, 1 to 45 parts by weight or 1 to 40 parts by weight with respect to 100 parts by weight of the composition for preparing a resin.

The compound of Chemical Formula 1a may be prepared by the following Reaction Scheme 1.

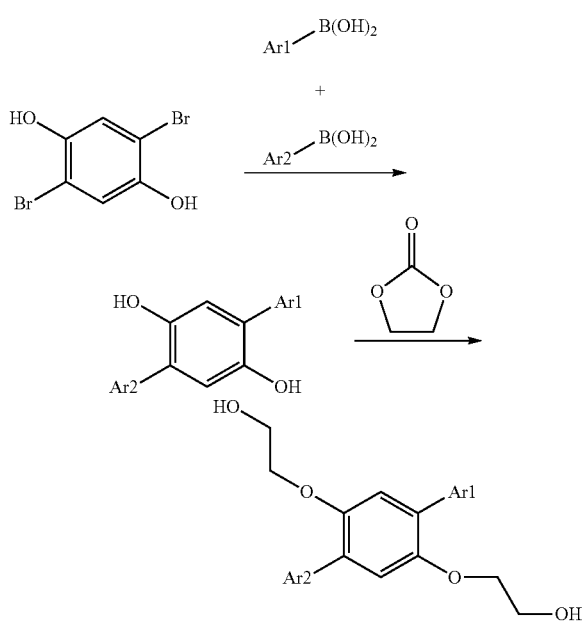

In the Reaction Scheme, the definition of the substituent is the same as the definition in the above-described Chemical Formula 1a.

The compound of Chemical Formula 2a-1 may be prepared by the following Reaction Scheme 2.

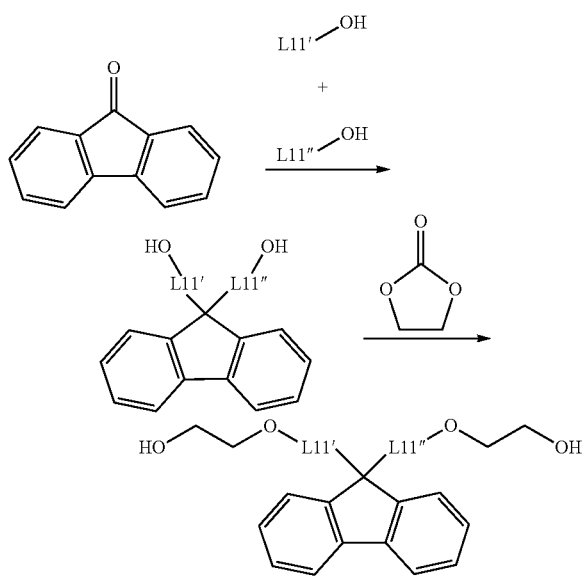

In the Reaction Scheme, the definitions of the other substituents are the same as the definition in the above-described Chemical Formula 2a-1.

Although the Reaction Scheme exemplifies a process of synthesizing a compound in which a specific substituent is bonded to a specific position, a unit corresponding to the range of Chemical Formula 1a or Chemical Formula 2a may be synthesized by a synthesis method known in the art using a starting material, an intermediate material, and the like known in the art.

According to an exemplary embodiment of the present disclosure, the polyester precursor is the following Chemical Formula A, and the polycarbonate precursor is the following Chemical Formula B.

[Chemical Formula A]

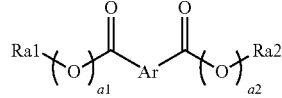

[Chemical Formula B]

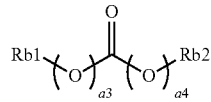

In Chemical Formulae A and B,

Ra1, Ra2, Rb1 and Rb2 are the same as or different from each other, and are each independently hydrogen; a halogen group; a hydroxyl group; a substituted or unsubstituted alkyl group; or a substituted or unsubstituted aryl group, Ar is a substituted or unsubstituted arylene group, and a1 to a4 are each 0 or 1.

According to an exemplary embodiment of the present disclosure, Ra1, Ra2, Rb1 and Rb2 are the same as or different from each other, and are each independently hydrogen; a halogen group; a hydroxyl group; a substituted or unsubstituted straight-chained or branched alkyl group having 1 to 30 carbon atoms; a substituted or unsubstituted monocyclic or polycyclic cycloalkyl group having 6 to 30 carbon atoms; or a substituted or unsubstituted monocyclic or polycyclic aryl group having 6 to 30 carbon atoms.

According to an exemplary embodiment of the present disclosure, Ra1, Ra2, Rb1 and Rb2 are the same as or different from each other, and are each independently hydrogen; a halogen group; a hydroxyl group; a substituted or unsubstituted straight-chained or branched alkyl group having 1 to 20 carbon atoms; a substituted or unsubstituted monocyclic or polycyclic cycloalkyl group having 6 to 20 carbon atoms; or a substituted or unsubstituted monocyclic or polycyclic aryl group having 6 to 20 carbon atoms.

According to an exemplary embodiment of the present disclosure, Ra1, Ra2, Rb1 and Rb2 are the same as or different from each other, and are each independently hydrogen; a halogen group; a hydroxyl group; a straight-chained or branched alkyl group having 1 to 30 carbon atoms, which is unsubstituted or substituted with a hydroxyl group; a monocyclic or polycyclic cycloalkyl group having 6 to 30 carbon atoms; or a monocyclic or polycyclic aryl group having 6 to 30 carbon atoms.

According to an exemplary embodiment of the present disclosure, Ra1, Ra2, Rb1 and Rb2 are the same as or different from each other, and are each independently hydrogen; a halogen group; a hydroxyl group; a straight-chained or branched alkyl group having 1 to 20 carbon atoms, which is unsubstituted or substituted with a hydroxyl group; a monocyclic or polycyclic cycloalkyl group having 6 to 20 carbon atoms; or a monocyclic or polycyclic aryl group having 6 to 20 carbon atoms.

According to an exemplary embodiment of the present disclosure, Ra1, Ra2, Rb1 and Rb2 are the same as or different from each other, and are each independently hydrogen; —Cl; a hydroxyl group; a methyl group; an ethyl group; an n-propyl group; an n-butyl group; an isopropyl group; an isobutyl group; a hydroxyethyl group; or a phenyl group.

According to an exemplary embodiment of the present disclosure, the definitions of the above-described La and Lb may be applied to the definition of Ar.

According to an exemplary embodiment of the present disclosure, Ar1 is a monocyclic or polycyclic arylene group having 6 to 30 carbon atoms.

According to an exemplary embodiment of the present disclosure, Ar1 is a monocyclic or polycyclic arylene group having 6 to 20 carbon atoms.

According to an exemplary embodiment of the present disclosure, Ar1 is a phenylene group; or a naphthylene group.

According to an exemplary embodiment of the present disclosure, Chemical Formula A is any one selected from the following compounds.

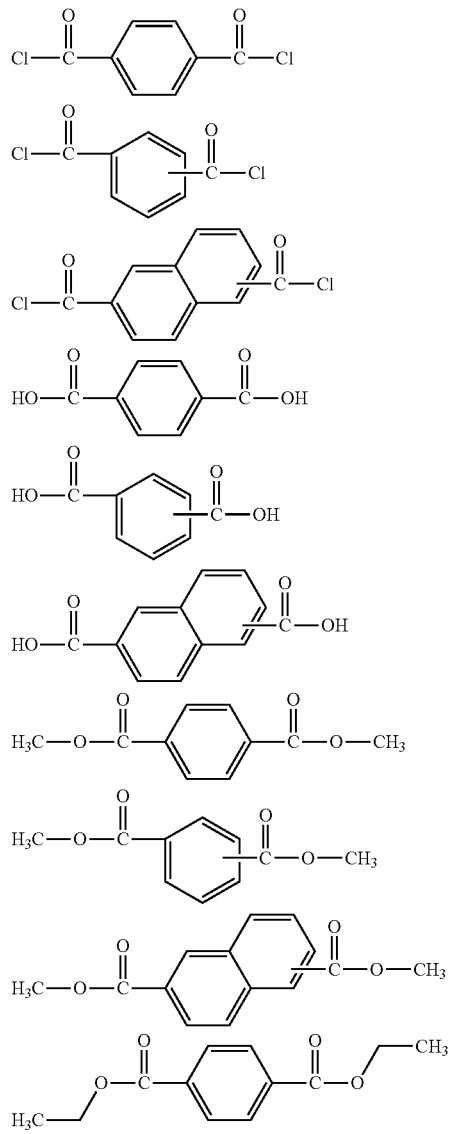

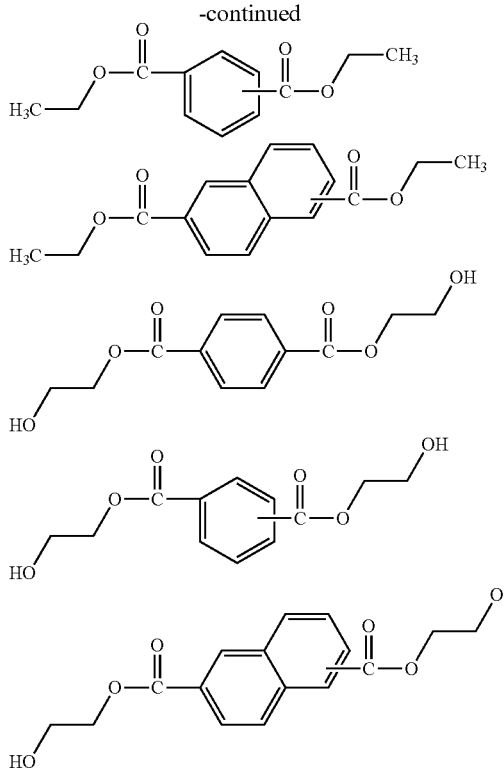

According to an exemplary embodiment of the present specification, Chemical Formula B is any one selected among the following compounds.

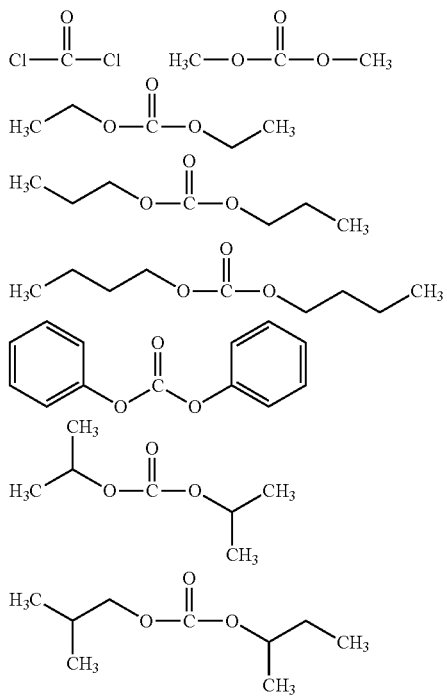

The polycarbonate precursor serves to link an additional comonomer, if necessary, and other specific examples thereof which may be applied in addition to the compound of Chemical Formula B include phosgene, triphosgene, diphosgene, bromophosgene, dimethyl carbonate, diethyl carbonate, dibutyl carbonate, dicyclohexyl carbonate, ditolyl carbonate, bis(chlorophenyl) carbonate, m-cresyl carbonate, dinaphthyl carbonate, bis(diphenyl) carbonate, bishaloformate, or the like, and any one of them or a mixture of two or more thereof may be used.

In an exemplary embodiment of the present disclosure, the resin is a polyester resin.

In an exemplary embodiment of the present disclosure, it is preferred that the resin is polymerized from the compound of Chemical Formula 1a; Chemical Formula 2a; and the polyester precursor of Chemical Formula A.

By polymerizing the compound of Chemical Formula 1a and the polyester precursor of Chemical Formula A, the unit of the above-described Chemical Formula 1 may be formed.

The compound of Chemical Formula 1a may be used in an amount of 1 part by mol to 99 parts by mol with respect to 100 parts by mol of the entire monomer constituting the resin including the unit of Chemical Formula 1.

The polyester precursor of Chemical Formula A may be used in an amount of 1 part by mol to 150 parts by mol, and 50 to 150 parts by mol with respect to 100 parts by mol of the entire monomer of the compound of Chemical Formula 1a constituting the resin.

By polymerizing the compound of Chemical Formula 2a and the polyester precursor of Chemical Formula A, the unit of the above-described Chemical Formula 2 may be formed.

The compound of Chemical Formula 2a may be used in an amount of 1 part by mol to 99 parts by mol with respect to 100 parts by mol of the entire monomer constituting the resin including the unit of Chemical Formula 2.

The polyester precursor of Chemical Formula A may be used in an amount of 1 part by mol to 150 parts by mol, and 50 to 150 parts by mol with respect to 100 parts by mol of the entire monomer of the compound of Chemical Formula 2a constituting the resin.

In an exemplary embodiment of the present disclosure, the resin is a polyester-carbonate resin.

In an exemplary embodiment of the present disclosure, it is preferred that the resin is polymerized from the compound of Chemical Formula 1a; the compound of Chemical Formula 2a; the polyester precursor of Chemical Formula A; and the polycarbonate precursor of Chemical Formula B.

The unit of the above-described Chemical Formula 1 may be formed by polymerizing the compound of Chemical Formula 1a; the polyester precursor of Chemical Formula A; and the polycarbonate precursor of Chemical Formula B, and the unit of the above-described Chemical Formula 2 may be formed by polymerizing the compound of Chemical Formula 2a; the polyester precursor of Chemical Formula A; and the polycarbonate precursor of Chemical Formula B.

The unit of the above-described Chemical Formula 1 may be formed by polymerizing the compound of Chemical Formula 1a; the polyester precursor of Chemical Formula A; and the polycarbonate precursor of Chemical Formula B.

The compound of Chemical Formula 1a may be used in an amount of 1 part by mol to 100 parts by mol, and 1 part by mol to 99 parts by mol with respect to 100 parts by mol of the entire monomer constituting the resin including the unit of Chemical Formula 1.

The polyester precursor of Chemical Formula A may be used in an amount of 1 part by mol to 150 parts by mol, and 50 to 150 parts by mol with respect to 100 parts by mol of the entire monomer of the compound of Chemical Formula 1a constituting the resin.

The polycarbonate precursor of Chemical Formula B may be used in an amount of 1 part by mol to 150 parts by mol, and 50 to 150 parts by mol with respect to 100 parts by mol of the entire monomer of the compound of Chemical Formula 1a constituting the resin.

The unit of the above-described Chemical Formula 2 may be formed by polymerizing the compound of Chemical Formula 2a; the polyester precursor of Chemical Formula A; and the polycarbonate precursor of Chemical Formula B.

The compound of Chemical Formula 2a may be used in an amount of 1 part by mol to 100 parts by mol, and 1 part by mol to 99 parts by mol with respect to 100 parts by mol of the entire monomer constituting the resin including the unit of Chemical Formula 2.

The polyester precursor of Chemical Formula A may be used in an amount of 1 part by mol to 150 parts by mol, and 50 to 150 parts by mol with respect to 100 parts by mol of the entire monomer of the compound of Chemical Formula 2a constituting the resin.

The polycarbonate precursor of Chemical Formula B may be used in an amount of 1 part by mol to 150 parts by mol, and 50 to 150 parts by mol with respect to 100 parts by mol of the entire monomer of the compound of Chemical Formula 2a constituting the resin.

In an exemplary embodiment of the present disclosure, the molar ratio of the compound of Chemical Formula 1a: the compound of Chemical Formula 2a is 0.01:99.99 to 99.99:0.01, preferably 0.1:99.9 to 99.9:0.1, and more preferably 1:99 to 99:1.

Preferably, the molar ratio of the compound represented by Chemical Formula 1a: the compound represented by Chemical Formula 2a is 20:80 to 50:50.

For the polymerization of the resin according to the present disclosure, methods known in the art may be used.

It is preferred that the polymerization is performed by a melt polycondensation method.

In the melt polycondensation method, a catalyst may be further applied as needed using the composition for preparing a resin, and melt polycondensation may be performed under heating and further under normal pressure or reduced pressure while removing by-products by an ester exchange reaction. As the catalyst, a material generally applied in the art may be adopted.

Specifically, in the melt polycondensation method, it is preferred that the compound of Chemical Formula 1a; the compound of Chemical Formula 2a; and the polyester precursor are melted in a reaction vessel, and then a reaction is performed in a state where a by-product compound is allowed to stay.

Alternatively, in the melt polycondensation method, it is preferred that the compound of Chemical Formula 1a; the compound of Chemical Formula 2a; the polyester precursor; and the polycarbonate precursor are melted in a reaction vessel, and then a reaction is performed in a state where a by-product compound is allowed to stay.

In order to allow the by-product compound to stay, the reaction device may be closed, or pressure may be controlled by reducing pressure or increasing pressure.

The reaction time of this process is 20 minutes or more and 600 minutes or less, preferably 40 minutes or more and 450 minutes or less, and more preferably 60 minutes or more and 300 minutes or less.

In this case, when the by-product compound is distilled off immediately after being produced, a resin to be finally obtained has a small content of high molecular weight materials. However, when the by-produced monohydroxy compound is allowed to stay in the reaction vessel for a certain period of time, the finally obtained resin is obtained to have a large content of high molecular weight materials.

The melt polycondensation method may be performed continuously or in a batch manner. The reaction device used for performing the reaction may be a vertical type equipped with an anchor type impeller, a Maxblend impeller, a helical ribbon type impeller or the like, may be a horizontal type equipped with a paddle blade, a lattice blade, a spectacle-shaped blade or the like, and may be an extruder type equipped with a screw. In addition, it is desirable to use a reaction device in which these reaction devices are appropriately combined in consideration of the viscosity of the polymer.

In the method for preparing a resin used in the present disclosure, the catalyst may be removed or deactivated in order to maintain heat stability and hydrolysis stability after the completion of the polymerization reaction. A method of deactivating the catalyst by adding a known acidic material in the art may be preferably performed.

As the acidic material, for example, esters such as butyl benzoate, aromatic sulfonic acids such as p-toluenesulfonic acid; aromatic sulfonic acid esters such as butyl p-toluenesulfonate and hexyl p-toluenesulfonate; phosphoric acids such as phosphorous acid, phosphoric acid and phosphonic acid; phosphorous acid esters such as triphenyl phosphite, monophenyl phosphite, diphenyl phosphite, diethyl phosphite, di-n-propyl phosphite, di-n-butyl phosphite, di-n-hexyl phosphite, dioctyl phosphite and monooctyl phosphite; phosphoric acid esters such as triphenyl phosphate, diphenyl phosphate, monophenyl phosphate, dibutyl phosphate, dioctyl phosphate and monooctyl phosphate; phosphonic acids such as diphenylphosphonic acid, dioctylphosphonic acid and dibutylphosphonic acid; phosphonic acid esters such as diethyl phenylphosphonate; phosphines such as triphenylphosphine and bis(diphenylphosphino) ethane; boric acids such as boric acid and phenylboric acid; aromatic sulfonic acid salts such as dodecylbenzenesulfonic acid tetrabutylphosphonium salts; organic halides such as stearic acid chloride, benzoyl chloride and p-toluenesulfonic acid chloride; alkylsulfuric acids such as dimethylsulfuric acid; organic halides such as benzyl chloride, and the like are preferably used.

The acidic material may be used in an amount of 0.1 parts by mol to 5 parts by mol, preferably 0.1 parts by mol to 1 part by mol with respect to 100 parts by mol of the catalyst. When the amount of the acidic material is smaller than 0.1 parts by mol, the deactivation effect becomes insufficient, which is not preferred. Further, when the amount exceeds 5 parts by mol, the heat resistance of the resin deteriorates and the molded article is easily colored, which is not preferred.

After the catalyst is deactivated, a process of devolatilizing a low boiling point compound in the resin may be further performed under a pressure of 0.1 mmHg to 1 mmHg and at a temperature of 200° C. to 350° C. In this process, a horizontal-type apparatus equipped with a stirring blade having excellent surface renewal ability such as a paddle blade, a lattice blade, and a spectacle-shaped blade, or a thin film evaporator is preferably used.

It is preferred that the content of foreign materials in the resin of the present disclosure is as small as possible, and filtration of a melting raw material, filtration of a catalyst solution, and the like are preferably performed.

The mesh of the filter used in the filtration is preferably 5 μm or less, and more preferably 1 μm or less. In addition, filtration of the produced resin using a polymer filter is preferably performed. The mesh of the polymer filter is preferably 100 μm or less, and more preferably 30 μm or less. Furthermore, a process of obtaining a resin pellet needs to be performed in a low-dust environment, and the environment is preferably Class 6 or lower, and more preferably Class 5 or lower.

Another exemplary embodiment of the present disclosure provides a resin composition including the resin according to the above-described exemplary embodiments.

In an exemplary embodiment of the present disclosure, the resin may be included in an amount of 1 part by weight to 80 parts by weight based on 100 parts by weight of the resin composition.

In an exemplary embodiment of the present disclosure, the resin composition may further include a solvent. The solvent may be, for example, dimethylacetamide or 1,2-dichlorobenzene.

The solvent may be included in an amount of 20 parts by weight to 99 parts by weight based on 100 parts by weight of the resin composition.

The resin composition may include the resin in which an additional monomer is further polymerized in addition to the compound of Chemical Formula 1a and the compound of Chemical Formula 2a. The additional monomer is not particularly limited, and a monomer generally applied in the art related to polyester may be appropriately adopted as long as the main physical properties of the resin composition are not changed. The additional monomer may be used in an amount of 1 part by mol to 50 parts by mol with respect to 100 parts by mol of the entire monomer constituting the resin including the unit of Chemical Formula 1 and the unit of Chemical Formula 2.

The resin composition may further include one or more selected from the group consisting of an additive, for example, an antioxidant, a plasticizer, an anti-static agent, a nucleating agent, a flame retardant, a lubricant, an impact modifier, a fluorescent brightener, a UV absorber, a pigment and a dye, if necessary, in addition to a resin including the unit of Chemical Formula 1 and the unit of Chemical Formula 2.

The additive may be included in an amount of 1 part by weight to 99 parts by weight based on 100 parts by weight of the resin composition.

The type of antioxidant, plasticizer, anti-static agent, nucleating agent, flame retardant, lubricant, impact modifier, fluorescent brightener, UV absorber, pigment or dye is not particularly limited, and those applied in the art may be appropriately adopted.

Still another exemplary embodiment of the present disclosure provides a molded article including the resin composition according to the above-described exemplary embodiments.

In an exemplary embodiment of the present disclosure, the molded article may be prepared from the resin composition or a cured product thereof.

As an example of a method of preparing the molded article, it is possible to include mixing a resin including the unit of the above-described Chemical Formula 1 and the unit of the above-described Chemical Formula 2 and the additive using a mixer efficiently, preparing the resulting mixture as a pellet by extrusion molding the mixture using an extruder, drying the pellet, and then injecting the pellet using an injection molding machine.

Further, examples of a method of molding a molded article including the resin include compression molding, molds, roll processing, extrusion molding, stretching, and the like in addition to injection molding, but are not limited thereto.

In an exemplary embodiment of the present disclosure, the molded article is an optical lens.

In an exemplary embodiment of the present disclosure, the optical lens has a thickness of 0.1 μm to 30 mm.

According to the difference in the refractive index of the optical lens, the position of the focal point where the light is focused varies in the lenses having the same thickness. This is illustrated in the FIGURE. This changes the position of the focal point focused between a camera lens and an image sensor and between the spectacle lens and the human pupil, and the thickness of the lens and film is reduced as the refractive index is increased to adjust the focal point at the same position. An optical lens according to an exemplary embodiment of the present disclosure has a high refractive index, and thus may implement an optical lens with a small thickness.

The optical lens is manufactured by using the resin, has a high refractive index and high transparency, and may be preferably applied to a camera.

In an exemplary embodiment of the present disclosure, the molded article is an optical film or optical thin film. The optical film or optical thin film is manufactured using the polyester resin, has a small thickness and excellent light harvesting effect and light diffusion effect, and may be preferably applied to backlight modules, flat lenses, and meta lenses of liquid crystal displays, and the like.

In an exemplary embodiment of the present disclosure, the optical film or optical thin film has a thickness of 0.1 nm to 10 mm.

In an exemplary embodiment of the present disclosure, the molded article is an optical resin. The optical resin is manufactured using the polyester resin, and has a low optical loss due to its small thickness, high refractive index and low birefringence.

The optical resin according to an exemplary embodiment of the present disclosure has a low optical loss due to its high refractive index and low birefringence.

The optical resin according to an exemplary embodiment of the present disclosure has a glass transition temperature of 90° C. to 200° C., which is not very high or low in heat resistance characteristics compared to general optical materials in the related art, and thus is easily processed and shows excellent heat resistance characteristics. When the glass transition temperature exceeds 200° C., it is difficult to process the optical resin because the melt flow index increases, and when the glass transition temperature is less than 90° C., the low heat resistance characteristics result in poor weatherability due to the external environment. Accordingly, there are few optical resins according to an exemplary embodiment of the present disclosure, which have suitable thermal properties and implement a high refractive index.

Examples

Hereinafter, the present disclosure will be exemplified in more detail through Examples.

Examples and Comparative Examples

1. Synthesis of Monomer 1-1

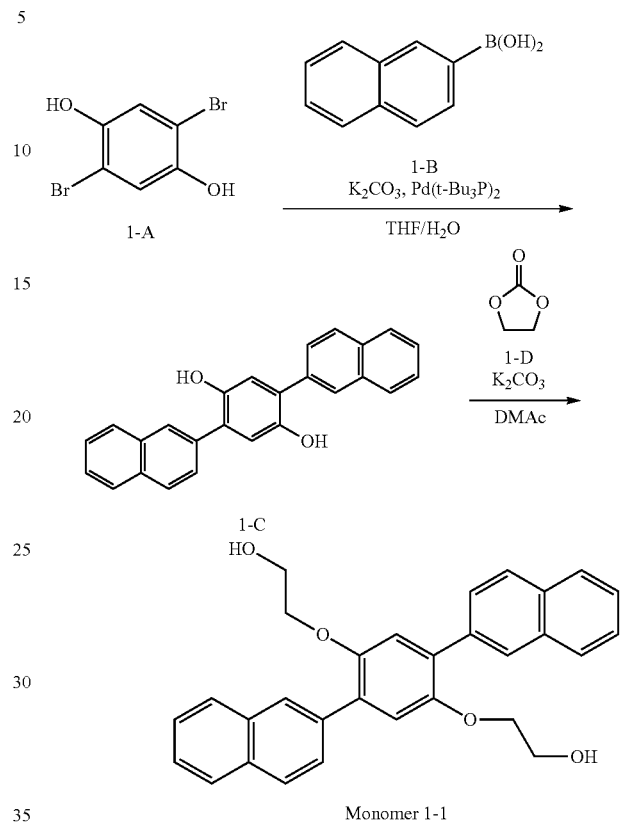

1) Synthesis of Intermediate 1-C 10.0 g (38.9 mmol, 1.0 eq) of Compound 1-A and 13.25 g (77 mmol, 2.05 eq) of Compound 1-B were dissolved in 90 g of tetrahydrofuran (THF), and the resulting solution was stirred in an oil bath at 80° C. for 30 minutes. After 15.48 g (112 mmol, 3.0 eq) of $K_2CO_3$ was dissolved in 100 mL of water, the solution was added dropwise thereto for 10 minutes while maintaining the internal temperature of the solution at 50° C. or higher. 0.76 g (1.5 mmol, 0.04 eq) of a $Pd(t-Bu_3P)_2$ catalyst was added thereto at an internal temperature of 60° C. After being stirred for 1 hour, the mixture was washed with ethyl acetate (EA)/$H_2O$ to separate the organic layer, and the solvent was concentrated in vacuum. After purification by column chromatography through n-hexane (n-Hex) and dichloromethane (DCM), the resulting product was precipitated in n-hexane (n-Hex) to obtain Intermediate 1-C as a solid.

2) Synthesis of Monomer 1-1

9.0 g (25 mmol, 1.0 eq) of Intermediate 1-C, 5.47 g (62 mmol, 2.5 eq) of Compound 1-D, and 1.37 g (5 mmol, 0.40 eq) of $K_2CO_3$ were dissolved in 45 g of dimethylacetamide (DMAc), and the resulting solution was stirred in an oil bath at 120° C. for 2 hours. After cooling, a solid was precipitated by adding water thereto, and then filtered.

The obtained solid was purified by column chromatography through ethyl acetate (EA) and dichloromethane (DCM), and then precipitated in n-hexane (n-Hex) to obtain 6.7 g of Monomer 1-1 as a white solid.

MS: $[M+H]^+=450$

2. Synthesis of Monomer 2-6

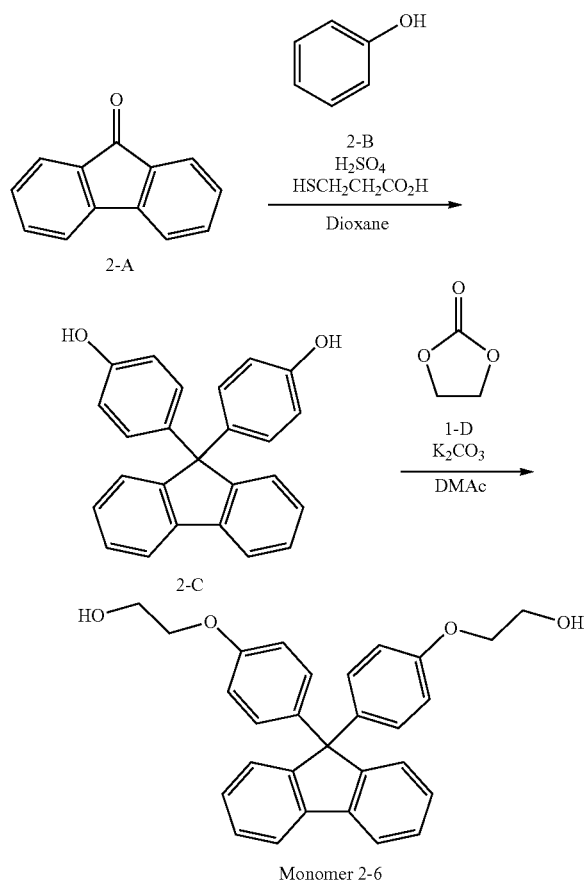

1) Synthesis of Intermediate 2-C 18.1 g (100 mmol, 1.0 eq) of Compound 2-A and 47.1 g (500 mmol, 5.0 eq) of Compound 2-B were dissolved in 80 g of 1,4-dioxane, and the resulting solution was stirred in a bath at 60° C. for 30 minutes. While maintaining the temperature, 29.4 g (300 mmol, 3.0 eq) of $H_2SO_4$ was added dropwise thereto for 30 minutes. 0.53 g (5 mmol, 0.05 eq) of 3-mercaptopropionic acid ($HSCH_2CH_2CO_2H$) was added thereto. After being stirred for 6 hours, the mixture was washed several times with toluene/10% NaOH for neutralization, and the organic layer was separated and precipitated in n-hexane (n-Hex) to obtain Intermediate 2-C.

2) Synthesis of Monomer 2-6

35 g (100 mmol, 1.0 eq) of Intermediate 2-C, 19.39 g (220 mmol, 2.2 eq) of Compound 1-D, and 2.77 g (20 mmol, 0.20 eq) of $K_2CO_3$ were dissolved in 240 g of dimethylacetamide (DMAc), and the resulting solution was stirred in an oil bath at 120° C. for 2 hours. After cooling, a solid was precipitated by adding water thereto, and then filtered. The obtained solid was purified by column chromatography through ethyl acetate (EA) and dichloromethane (DCM), and then precipitated in n-hexane (n-Hex) to obtain 28.1 g of Monomer 2 as a white solid. Further, Monomer 2-6 can be purchased from TCI or Sigma-Aldrich.

MS: $[M+H]^+$=438

3. Monomer 2-8

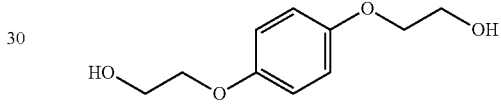

Monomer 2-8 was purchased from Sigma-Aldrich and used.

Preparation Example 1-1. Preparation of Resin 1-1

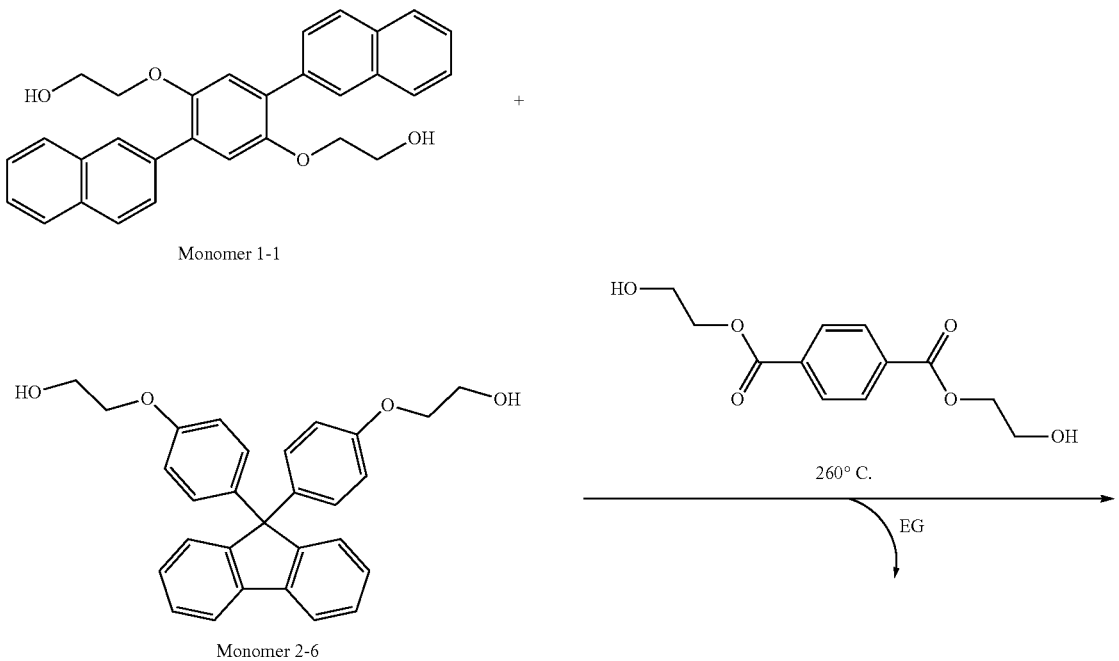

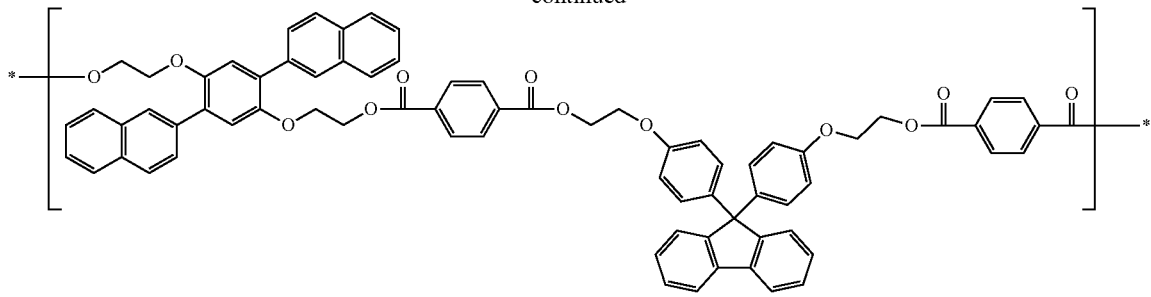

Resin 1-1

9 g (20 mmol) of Monomer 1-1, 35.1 g (80 mmol) of Monomer 2-6, and 25.4 g (100 mmol) of bis-2-hydroxyethylterephthalate were melted, and reacted at 260° C. for 6 hours. As the reaction proceeded, ethylene glycol was generated as a by-product, and the degree of decompression was adjusted up to 1 Torr to remove the ethylene glycol. After completion of the reaction, a polymer molten resin polymerized by blowing nitrogen into the reactor to create a normal pressure atmosphere was taken out, whereby Resin 1-1 in Example 1-1 was obtained.

Preparation Example 1-2. Preparation of Resin 1-2

Resin 1-2 of Example 1-2 was prepared in the same manner as in the method of preparing the resin of Example 1-1, except that 18 g (40 mmol) of Monomer 1-1 and 26.3 g (60 mmol) of Monomer 2-6 were applied to the preparation of the resin of Example 1-1.

Preparation Example 1-3. Preparation of Resin 1-3

Resin 1-3 of Example 1-3 was prepared in the same manner as in the method of preparing the resin of Example 1-1, except that 22.5 g (50 mmol) of Monomer 1-1 and 21.9 g (50 mmol) of Monomer 2-6 were applied to the preparation of the resin of Example 1-1.

Preparation Example 2-1. Preparation of Resin 2-1

45.05 g (100 mmol) of Monomer 1-1 and 19.42 g (100 mmol) of dimethyl terephthalate were melted and reacted at 250° C. for 5 hours. As the reaction proceeded, methanol was generated as a by-product, and the degree of decompression was adjusted up to 1 Torr to remove the methanol. After completion of the reaction, Resin 2-1, which is a polymer molten resin polymerized by blowing nitrogen into the reactor to create a normal pressure atmosphere, was obtained.

Monomer 1-1:

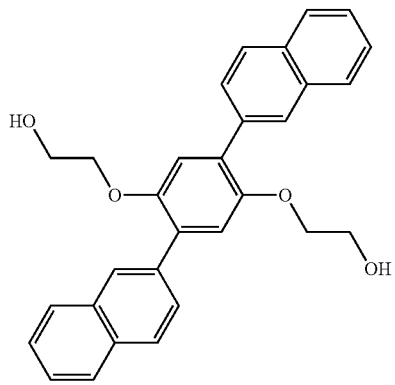 [SMILES: OCCOc1cc(-c2ccc3ccccc3c2)c(OCCO)cc1-c1ccc2ccccc2c1]

Preparation Example 2-2. Preparation of Resin 2-2

22.53 g (50 mmol) of Monomer 1-1, 9.91 g (50 mmol) of Monomer 2-8, and 19.42 g (100 mmol) of dimethyl terephthalate were melted and reacted at 250° C. for 5 hours. As the reaction proceeded, methanol was generated as a by-product, and the degree of decompression was adjusted up to 1 Torr to remove the methanol. After completion of the reaction, Resin 2-2, which is a polymer molten resin polymerized by blowing nitrogen into the reactor to create a normal pressure atmosphere, was obtained.

monomer 2-1

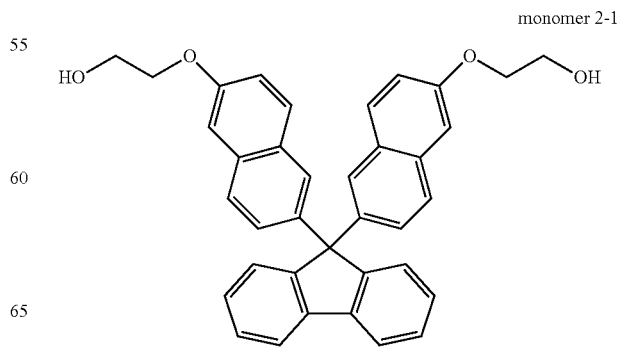

monomer 2-2

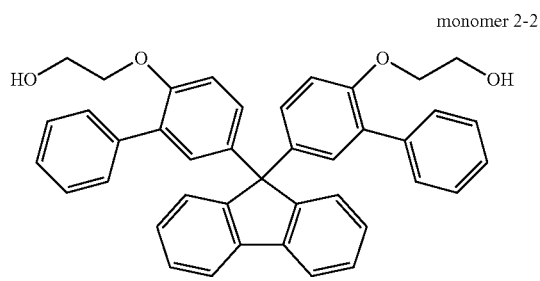

monomer 2-3 monomer 2-4

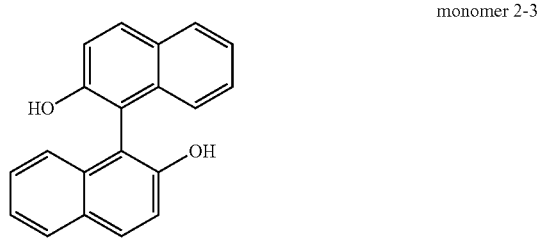

monomer 2-5 monomer 2-6

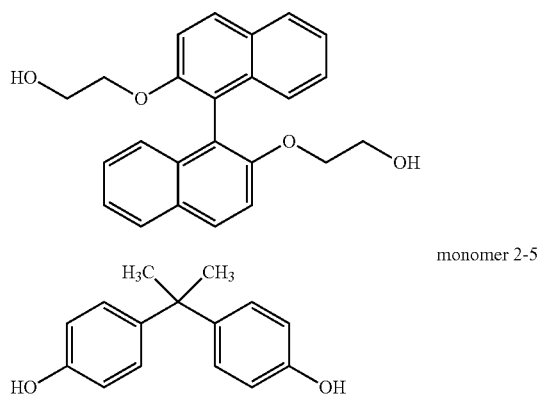

monomer 2-7 monomer 2-8 monomer 2-9

Preparation Example 2-3. Preparation of Resin 2-3

24.78 g (55 mmol) of Monomer 1-1, 1.87 g (5 mmol) of Monomer 2-4, 21.55 g (40 mmol) of Monomer 2-1, and 19.42 g (100 mmol) of dimethyl terephthalate were melted and reacted at 250° C. for 5 hours. As the reaction proceeded, methanol was generated as a by-product, and the degree of decompression was adjusted up to 1 Torr to remove the methanol. After completion of the reaction, Resin 2-3, which is a polymer molten resin polymerized by blowing nitrogen into the reactor to create a normal pressure atmosphere, was obtained.

Preparation Example 2-4. Preparation of Resin 2-4

24.78 g (55 mmol) of Monomer 1-1, 2.28 g (10 mmol) of Monomer 2-5, 18.85 g (35 mmol) of Monomer 2-1, and 19.42 g (100 mmol) of dimethyl terephthalate were melted and reacted at 250° C. for 5 hours. As the reaction proceeded, methanol was generated as a by-product, and the degree of decompression was adjusted up to 1 Torr to remove the methanol. After completion of the reaction, Resin 2-4, which is a polymer molten resin polymerized by blowing nitrogen into the reactor to create a normal pressure atmosphere, was obtained.

Preparation Example 2-5. Preparation of Resin 2-5

2.25 g (5 mmol) of Monomer 1-1, 26.58 g (45 mmol) of Monomer 2-2, 26.93 g (50 mmol) of Monomer 2-1, and 19.42 g (100 mmol) of dimethyl terephthalate were melted and reacted at 250° C. for 5 hours. As the reaction proceeded, methanol was generated as a by-product, and the degree of decompression was adjusted up to 1 Torr to remove the methanol. After completion of the reaction, Resin 2-5, which is a polymer molten resin polymerized by blowing nitrogen into the reactor to create a normal pressure atmosphere, was obtained.

Preparation Example 2-6. Preparation of Resin 2-6

2.25 g (5 mmol) of Monomer 1-1, 26.58 g (45 mmol) of Monomer 2-2, 18.71 g (50 mmol) of Monomer 2-4, and 19.42 g (100 mmol) of dimethyl terephthalate were melted and reacted at 250° C. for 5 hours. As the reaction proceeded, methanol was generated as a by-product, and the degree of decompression was adjusted up to 1 Torr to remove the methanol. After completion of the reaction, Resin 2-6, which is a polymer molten resin polymerized by blowing nitrogen into the reactor to create a normal pressure atmosphere, was obtained.

Preparation Example 2-7. Preparation of Resin 2-7

2.25 g (5 mmol) of Monomer 1-1, 4.57 g (20 mmol) of Monomer 2-5, 11.22 g (30 mmol) of Monomer 2-4, 24.24 g (45 mmol) of Monomer 2-1, and 19.42 g (100 mmol) of dimethyl terephthalate were melted and reacted at 250° C. for 5 hours. As the reaction proceeded, methanol was generated as a by-product, and the degree of decompression was adjusted up to 1 Torr to remove the methanol. After completion of the reaction, Resin 2-7, which is a polymer molten resin polymerized by blowing nitrogen into the reactor to create a normal pressure atmosphere, was obtained.

Preparation Example 2-8. Preparation of Resin 2-8

2.25 g (5 mmol) of Monomer 1-1, 16.84 g (45 mmol) of Monomer 2-4, 21.93 g (50 mmol) of Monomer 2-6, and 19.42 g (100 mmol) of dimethyl terephthalate were melted and reacted at 250° C. for 5 hours. As the reaction proceeded, methanol was generated as a by-product, and the degree of decompression was adjusted up to 1 Torr to remove the methanol. After completion of the reaction, Resin 2-8, which is a polymer molten resin polymerized by blowing nitrogen into the reactor to create a normal pressure atmosphere, was obtained.

Preparation Example 2-9. Preparation of Resin 2-9

1.35 g (3 mmol) of Monomer 1-1, 15.95 g (27 mmol) of Monomer 2-2, 30.7 g (70 mmol) of Monomer 2-6, and 19.42 g (100 mmol) of dimethyl terephthalate were melted and reacted at 250° C. for 5 hours. As the reaction proceeded, methanol was generated as a by-product, and the degree of decompression was adjusted up to 1 Torr to remove the methanol. After completion of the reaction, Resin 2-9, which is a polymer molten resin polymerized by blowing nitrogen into the reactor to create a normal pressure atmosphere, was obtained.

Preparation Example 2-10. Preparation of Resin 2-10

2.25 g (5 mmol) of Monomer 1-1, 11.41 g (50 mmol) of Monomer 2-5, 19.73 g (45 mmol) of Monomer 2-6, and 19.42 g (100 mmol) of dimethyl terephthalate were melted and reacted at 250° C. for 5 hours. As the reaction proceeded, methanol was generated as a by-product, and the degree of decompression was adjusted up to 1 Torr to remove the methanol. After completion of the reaction, Resin 2-10, which is a polymer molten resin polymerized by blowing nitrogen into the reactor to create a normal pressure atmosphere, was obtained.

Preparation Example 2-11. Preparation of Resin 2-11

6.76 g (15 mmol) of Monomer 1-1, 4.96 g (25 mmol) of Monomer 2-8, 21.03 g (60 mmol) of Monomer 2-7, and 19.42 g (100 mmol) of dimethyl terephthalate were melted and reacted at 250° C. for 5 hours. As the reaction proceeded, methanol was generated as a by-product, and the degree of decompression was adjusted up to 1 Torr to remove the methanol. After completion of the reaction, Resin 2-11, which is a polymer molten resin polymerized by blowing nitrogen into the reactor to create a normal pressure atmosphere, was obtained.

Preparation Example 2-12. Preparation of Resin 2-12

6.76 g (15 mmol) of Monomer 1-1, 4.96 g (25 mmol) of Monomer 2-8, 17.18 g (60 mmol) of Monomer 2-3, and 19.42 g (100 mmol) of dimethyl terephthalate were melted and reacted at 250° C. for 5 hours. As the reaction proceeded, methanol was generated as a by-product, and the degree of decompression was adjusted up to 1 Torr to remove the methanol. After completion of the reaction, Resin 2-12, which is a polymer molten resin polymerized by blowing nitrogen into the reactor to create a normal pressure atmosphere, was obtained.

Preparation Example 2-13. Preparation of Resin 2-13

6.76 g (15 mmol) of Monomer 1-1, 4.96 g (25 mmol) of Monomer 2-8, 22.71 g (60 mmol) of Monomer 2-9, and 19.42 g (100 mmol) of dimethyl terephthalate were melted and reacted at 250° C. for 5 hours. As the reaction proceeded, methanol was generated as a by-product, and the degree of decompression was adjusted up to 1 Torr to remove the methanol. After completion of the reaction, Resin 2-13, which is a polymer molten resin polymerized by blowing nitrogen into the reactor to create a normal pressure atmosphere, was obtained.

Preparation Example 2-14. Preparation of Resin 2-14

2.25 g (5 mmol) of Monomer 1-1, 26.58 g (45 mmol) of Monomer 2-2, 18.71 g (50 mmol) of Monomer 2-4, 13.59 g (70 mmol) of dimethyl terephthalate, and 5.83 g (30 mmol) of dimethyl isophthalate were melted and reacted at 250° C. for 5 hours. As the reaction proceeded, methanol was generated as a by-product, and the degree of decompression was adjusted up to 1 Torr to remove the methanol. After completion of the reaction, Resin 2-14, which is a polymer molten resin polymerized by blowing nitrogen into the reactor to create a normal pressure atmosphere, was obtained.

Preparation Example 2-15. Preparation of Resin 2-15

2.25 g (5 mmol) of Monomer 1-1, 26.58 g (45 mmol) of Monomer 2-2, 18.71 g (50 mmol) of Monomer 2-4, 9.71 g (50 mmol) of dimethyl terephthalate, and 9.71 g (50 mmol) of dimethyl isophthalate were melted and reacted at 250° C. for 5 hours. As the reaction proceeded, methanol was generated as a by-product, and the degree of decompression was adjusted up to 1 Torr to remove the methanol. After completion of the reaction, Resin 2-15, which is a polymer molten resin polymerized by blowing nitrogen into the reactor to create a normal pressure atmosphere, was obtained.

TABLE 1

| | | Monomer 1-1 | Monomer 2-1 | Monomer 2-2 | Monomer 2-3 | Monomer 2-4 | Monomer 2-5 | Monomer 2-6 | Monomer 2-7 | Monomer 2-8 | Monomer 2-9 | para | meta |
|---|---|---|---|---|---|---|---|---|---|---|---|---|---|
| Example 2-1 | Resin 2-1 | 100 | | | | | | | | 100 | | 100 | |
| Example 2-2 | Resin 2-2 | 50 | | | | | | | | 50 | | 100 | |
| Example 2-3 | Resin 2-3 | 55 | 40 | | | 5 | | | | | | 100 | |
| Example 2-4 | Resin 2-4 | 55 | 35 | | | | 10 | | | | | 100 | |
| Example 2-5 | Resin 2-5 | 5 | 50 | 45 | | | | | | | | 100 | |
| Example 2-6 | Resin 2-6 | 5 | | 45 | 50 | | | | | | | 100 | |
| Example 2-7 | Resin 2-7 | 5 | 45 | | | 30 | 20 | | | | | 100 | |
| Example 2-8 | Resin 2-8 | 5 | | | | 45 | | 50 | | | | 100 | |
| Example 2-9 | Resin 2-9 | 3 | 27 | | | | | 70 | | | | 100 | |
| Example 2-10 | Resin 2-10 | 5 | | | | | 50 | 45 | | | | 100 | |
| Example 2-11 | Resin 2-11 | 15 | | | | | | | 60 | 25 | | 100 | |
| Example 2-12 | Resin 2-12 | 15 | | 60 | | | | | | 25 | | 100 | |
| Example 2-13 | Resin 2-13 | 15 | | | | | | | | 25 | 60 | 100 | |
| Example 2-14 | Resin 2-14 | 5 | 45 | | | 50 | | | | | | 70 | 30 |
| Example 2-15 | Resin 2-15 | 5 | 45 | | | 50 | | | | | | 50 | 50 |

Table 1 shows the part by mol of each monomer included in Resins 2-1 to 2-15 of Examples 2-1 to 2-15. Further, the para means the part by mol of dimethyl terephthalate which is a polyester precursor, and the meta means the part by mol of dimethyl isophthalate which is a polyester precursor.

Preparation Example 3-1. Preparation of Resin 3-1

45.05 g (0.100 mol) of Monomer 1-1, 15.00 g (0.070 mol) of diphenylcarbonate, and 5.83 g (0.030 mol) of dimethyl terephthalate were melted and reacted at 250° C. for 5 hours. As the reaction proceeded, phenol was generated as a by-product, and the degree of decompression was adjusted up to 1 Torr to remove the phenol. After completion of the reaction, Resin 3-1, which is a polymer molten resin polymerized by blowing nitrogen into the reactor to create a normal pressure atmosphere, was obtained.

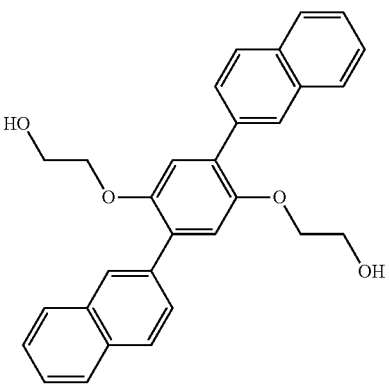 [SMILES: OCCOc1cc(-c2ccc3ccccc3c2)c(OCCO)cc1-c1ccc2ccccc2c1]

Monomer 1-1:

Preparation Example 3-2. Preparation of Resin 3-2

31.54 g (0.07 mol) of Monomer 1-1, 14.36 g (0.03 mol) of Monomer 1-2, 15.00 g (0.070 mol) of diphenylcarbonate, and 5.83 g (0.030 mol) of dimethyl terephthalate were melted and reacted at 250° C. for 5 hours. As the reaction proceeded, phenol was generated as a by-product, and the degree of decompression was adjusted up to 1 Torr to remove the phenol. After completion of the reaction, Resin 3-2, which is a polymer molten resin polymerized by blowing nitrogen into the reactor to create a normal pressure atmosphere, was obtained.

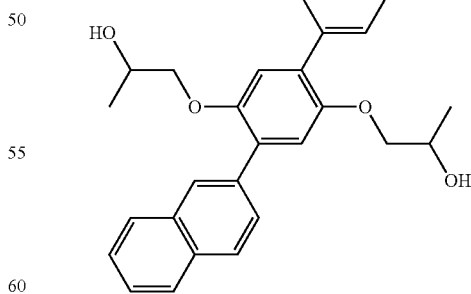

Monomer 1-2:

Preparation Example 3-3. Preparation of Resin 3-3

13.52 g (0.030 mol) of Monomer 1-1, 26.59 g (0.040 mol) of Monomer 2-1, 13.52 g (0.030 mol) of Monomer 2-2, 15.00 g (0.070 mol) of diphenylcarbonate, and 5.83 g (0.030 mol) of dimethyl terephthalate were melted and reacted at 250° C. for 5 hours. As the reaction proceeded, phenol was generated as a by-product, and the degree of decompression was adjusted up to 1 Torr to remove the phenol. After completion of the reaction, Resin 3-3, which is a polymer molten resin polymerized by blowing nitrogen into the reactor to create a normal pressure atmosphere, was obtained.

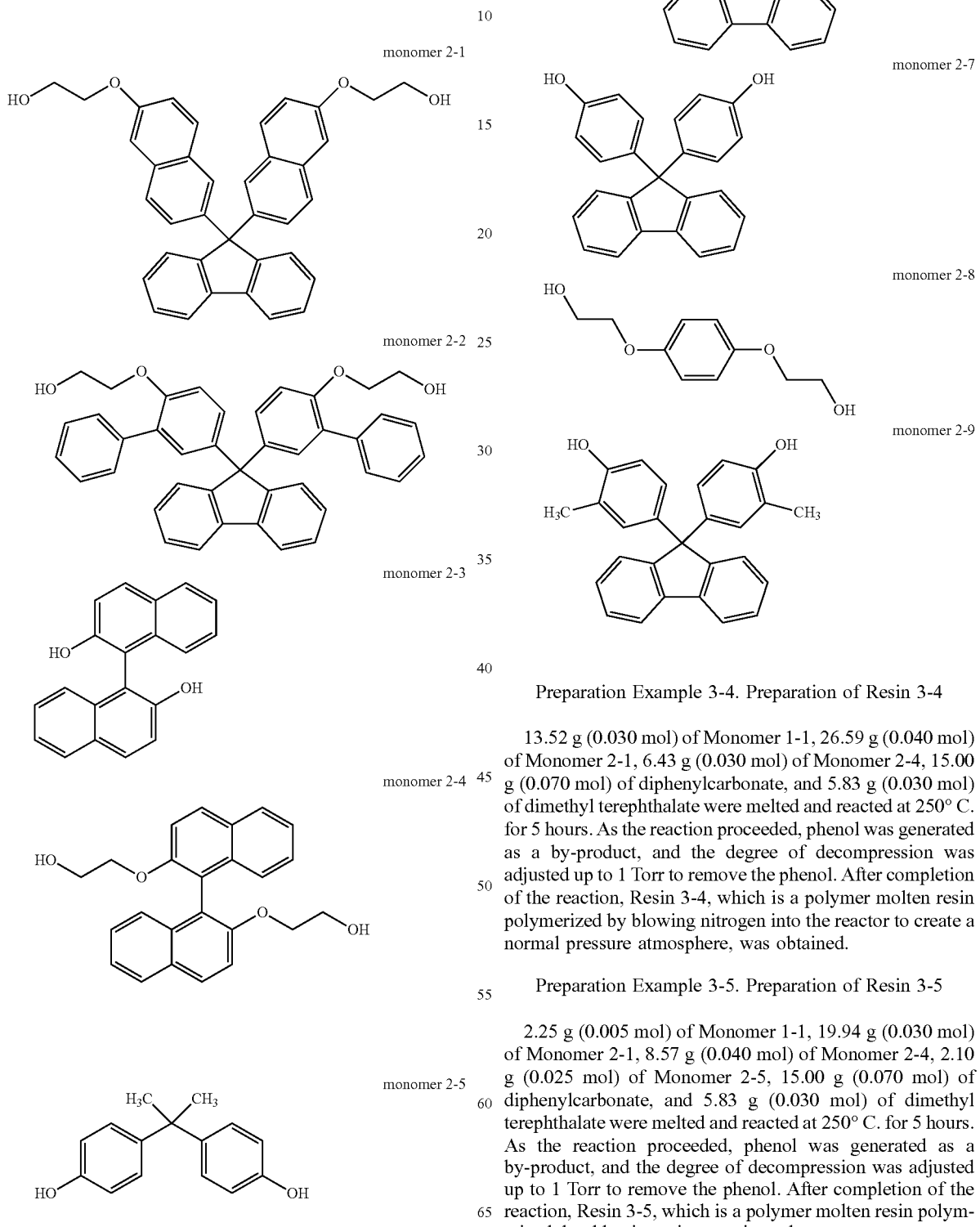

Preparation Example 3-4. Preparation of Resin 3-4

13.52 g (0.030 mol) of Monomer 1-1, 26.59 g (0.040 mol) of Monomer 2-1, 6.43 g (0.030 mol) of Monomer 2-4, 15.00 g (0.070 mol) of diphenylcarbonate, and 5.83 g (0.030 mol) of dimethyl terephthalate were melted and reacted at 250° C. for 5 hours. As the reaction proceeded, phenol was generated as a by-product, and the degree of decompression was adjusted up to 1 Torr to remove the phenol. After completion of the reaction, Resin 3-4, which is a polymer molten resin polymerized by blowing nitrogen into the reactor to create a normal pressure atmosphere, was obtained.

Preparation Example 3-5. Preparation of Resin 3-5

2.25 g (0.005 mol) of Monomer 1-1, 19.94 g (0.030 mol) of Monomer 2-1, 8.57 g (0.040 mol) of Monomer 2-4, 2.10 g (0.025 mol) of Monomer 2-5, 15.00 g (0.070 mol) of diphenylcarbonate, and 5.83 g (0.030 mol) of dimethyl terephthalate were melted and reacted at 250° C. for 5 hours. As the reaction proceeded, phenol was generated as a by-product, and the degree of decompression was adjusted up to 1 Torr to remove the phenol. After completion of the reaction, Resin 3-5, which is a polymer molten resin polymerized by blowing nitrogen into the reactor to create a normal pressure atmosphere, was obtained.

Preparation Example 3-6. Preparation of Resin 3-6

2.25 g (0.005 mol) of Monomer 1-1, 26.63 g (0.040 mol) of Monomer 2-3, 2.10 g (0.025 mol) of Monomer 2-5, 2.70 g (0.030 mol) of Monomer 2-8, 6.43 g (0.030 mol) of diphenylcarbonate, 9.71 g (0.050 mol) of dimethyl terephthalate, and 3.88 g (0.020 mol) of dimethyl isophthalate were melted and reacted at 250° C. for 5 hours. As the reaction proceeded, phenol was generated as a by-product, and the degree of decompression was adjusted up to 1 Torr to remove the phenol. After completion of the reaction, Resin 3-6, which is a polymer molten resin polymerized by blowing nitrogen into the reactor to create a normal pressure atmosphere, was obtained.

Preparation Example 3-7. Preparation of Resin 3-7

2.25 g (0.005 mol) of Monomer 1-1, 24.60 g (0.037 mol) of Monomer 2-1, 9.64 g (0.045 mol) of Monomer 2-4, 0.31 g (0.013 mol) of Monomer 2-6, 6.43 g (0.030 mol) of diphenylcarbonate, 9.71 g (0.050 mol) of dimethyl terephthalate, and 3.88 g (0.020 mol) of dimethyl isophthalate were melted and reacted at 250° C. for 5 hours. As the reaction proceeded, phenol was generated as a by-product, and the degree of decompression was adjusted up to 1 Torr to remove the phenol. After completion of the reaction, Resin 3-7, which is a polymer molten resin polymerized by blowing nitrogen into the reactor to create a normal pressure atmosphere, was obtained.

Preparation Example 3-8. Preparation of Resin 3-8

2.25 g (0.005 mol) of Monomer 1-1, 9.64 g (0.045 mol) of Monomer 2-4, 1.35 g (0.015 mol) of Monomer 2-8, 13.10 g (0.035 mol) of Monomer 2-9, 6.43 g (0.030 mol) of diphenylcarbonate, 9.71 g (0.050 mol) of dimethyl terephthalate, and 3.88 g (0.020 mol) of dimethyl isophthalate were melted and reacted at 250° C. for 5 hours. As the reaction proceeded, phenol was generated as a by-product, and the degree of decompression was adjusted up to 1 Torr to remove the phenol. After completion of the reaction, Resin 3-8, which is a polymer molten resin polymerized by blowing nitrogen into the reactor to create a normal pressure atmosphere, was obtained.

Preparation Example 3-9. Preparation of Resin 3-9

2.25 g (0.005 mol) of Monomer 1-1, 7.50 g (0.035 mol) of Monomer 2-4, 2.61 g (0.045 mol) of Monomer 2-7, 1.35 g (0.015 mol) of Monomer 2-8, 6.43 g (0.030 mol) of diphenylcarbonate, 9.71 g (0.050 mol) of dimethyl terephthalate, and 3.88 g (0.020 mol) of dimethyl isophthalate were melted and reacted at 250° C. for 5 hours. As the reaction proceeded, phenol was generated as a by-product, and the degree of decompression was adjusted up to 1 Torr to remove the phenol. After completion of the reaction, Resin 3-9, which is a polymer molten resin polymerized by blowing nitrogen into the reactor to create a normal pressure atmosphere, was obtained.

Preparation Example 3-10. Preparation of Resin 3-10

0.45 g (0.001 mol) of Monomer 1-1, 18.61 g (0.028 mol) of Monomer 2-1, 7.21 g (0.016 mol) of Monomer 2-2, 11.78 g (0.055 mol) of Monomer 2-4, 6.43 g (0.030 mol) of diphenylcarbonate, 9.71 g (0.050 mol) of dimethyl terephthalate, and 3.88 g (0.020 mol) of dimethyl isophthalate were melted and reacted at 250° C. for 5 hours. As the reaction proceeded, phenol was generated as a by-product, and the degree of decompression was adjusted up to 1 Torr to remove the phenol. After completion of the reaction, Resin 3-10, which is a polymer molten resin polymerized by blowing nitrogen into the reactor to create a normal pressure atmosphere, was obtained.

Preparation Example 3-11. Preparation of Resin 3-11

2.25 g (0.005 mol) of Monomer 1-1, 23.27 g (0.035 mol) of Monomer 2-1, 7.50 g (0.035 mol) of Monomer 2-4, 2.10 g (0.025 mol) of Monomer 2-5, 8.57 g (0.040 mol) of diphenylcarbonate, 8.74 g (0.045 mol) of dimethyl terephthalate, and 2.91 g (0.015 mol) of dimethyl isophthalate were melted and reacted at 250° C. for 5 hours. As the reaction proceeded, phenol was generated as a by-product, and the degree of decompression was adjusted up to 1 Torr to remove the phenol. After completion of the reaction, Resin 3-11, which is a polymer molten resin polymerized by blowing nitrogen into the reactor to create a normal pressure atmosphere, was obtained.

Preparation Example 3-12. Preparation of Resin 3-12

2.25 g (0.005 mol) of Monomer 1-1, 15.77 g (0.035 mol) of Monomer 2-2, 8.57 g (0.040 mol) of Monomer 2-4, 0.48 g (0.020 mol) of Monomer 2-6, 10.71 g (0.050 mol) of diphenylcarbonate, 6.80 g (0.035 mol) of dimethyl terephthalate, and 2.91 g (0.015 mol) of dimethyl isophthalate were melted and reacted at 250° C. for 5 hours. As the reaction proceeded, phenol was generated as a by-product, and the degree of decompression was adjusted up to 1 Torr to remove the phenol. After completion of the reaction, Resin 3-12, which is a polymer molten resin polymerized by blowing nitrogen into the reactor to create a normal pressure atmosphere, was obtained.

Preparation Example 3-13. Preparation of Resin 3-13

2.25 g (0.005 mol) of Monomer 1-1, 11.97 g (0.018 mol) of Monomer 2-1, 18.92 g (0.042 mol) of Monomer 2-2, 7.50 g (0.035 mol) of Monomer 2-4, 12.85 g (0.060 mol) of diphenylcarbonate, 5.83 g (0.030 mol) of dimethyl terephthalate, and 1.94 g (0.010 mol) of dimethyl isophthalate were melted and reacted at 250° C. for 5 hours. As the reaction proceeded, phenol was generated as a by-product, and the degree of decompression was adjusted up to 1 Torr to remove the phenol. After completion of the reaction, Resin 3-13, which is a polymer molten resin polymerized by blowing nitrogen into the reactor to create a normal pressure atmosphere, was obtained.

TABLE 2

| | | Monomer 1-1 | Monomer 1-2 | Monomer 2-1 | Monomer 2-2 | Monomer 2-3 | Monomer 2-4 | Monomer 2-5 | Monomer 2-6 | Monomer 2-7 | Monomer 2-8 | Monomer 2-9 | PC precursor | PE precursor (para) | PE precursor (meta) |
|---|---|---|---|---|---|---|---|---|---|---|---|---|---|---|---|
| Example 3-1 | Resin 3-1 | 100 | | | | | | | | | | | 70 | 30 | |
| Example 3-2 | Resin 3-2 | 70 | 30 | | | | | | | | | | 70 | 30 | |
| Example 3-3 | Resin 3-3 | 30 | | 40 | 30 | | | | | | | | 70 | 30 | |
| Example 3-4 | Resin 3-4 | 30 | | 40 | | | 30 | | | | | | 70 | 30 | |
| Example 3-5 | Resin 3-5 | 5 | | 30 | | | 40 | 25 | | | | | 70 | 30 | |
| Example 3-6 | Resin 3-6 | 5 | | | 40 | | | 25 | | | 30 | | 30 | 50 | 20 |
| Example 3-7 | Resin 3-7 | 5 | | 37 | | | 45 | | 13 | | | | 30 | 50 | 20 |
| Example 3-8 | Resin 3-8 | 5 | | | | | 45 | | | 15 | 35 | | 30 | 50 | 20 |
| Example 3-9 | Resin 3-9 | 5 | | | | | 35 | | 45 | 15 | | | 30 | 50 | 20 |
| Example 3-10 | Resin 3-10 | 1 | | 28 | 16 | 55 | | | | | | | 30 | 50 | 20 |
| Example 3-11 | Resin 3-11 | 5 | | 35 | | 35 | | 25 | | | | | 40 | 45 | 15 |
| Example 3-12 | Resin 3-12 | 5 | | | 35 | 40 | | 20 | | | | | 50 | 35 | 15 |
| Example 3-13 | Resin 3-13 | 5 | | 18 | 42 | 35 | | | | | | | 60 | 30 | 10 |

Table 2 shows the part by mol of each monomer included in Resins 3-1 to 3-13 of Examples 3-1 to 3-13. Further, the PE precursor (para) means the part by mol of dimethyl terephthalate which is a polyester precursor, and the PE precursor (meta) means the part by mol of dimethyl isophthalate which is a polyester precursor.

Experimental Example

The molecular weight and molecular weight distribution of the polymerized resin sample were confirmed through gel permeation chromatography (GPC), and a thermogram was obtained using a differential scanning calorimeter (DSC) to investigate the thermal characteristics. After a film was formed to measure the refractive index and the Abbe's Number, a result value according to the wavelength of light was obtained using an ellipsometer.

For the molecular weight through gel permeation chromatography (GPC), results were obtained by injecting a solution produced by using tetrahydrofuran (THF, stabilized with butylated hydroxytoluene (BHT)) as a solvent, dissolving the resin sample in tetrahydrofuran at a concentration of 1.0 mg/1 ml, and filtering the dissolved resin sample with a syringe filter, and measuring the molecular weight at 40° C., and the results are each shown in the following Tables 3 to 5. A Waters RI detector was used, and two Agilent PLgel MIXED-B columns were used.

A differential scanning calorimeter (DSC) was measured to determine the glass transition temperature (Tg) of the resin. A glass transition temperature (Tg) was obtained on a graph obtained by heating a 5.5 mg to 8.5 mg of the resin sample to 270° C. under $N_2$ flow, cooling the resin sample, and then scanning the resin sample while heating the resin sample at a heating rate of 10° C./min during the second heating, and the glass transition temperature (Tg) is each shown in the following Tables 3 to 5.

In order to measure the refractive index and Abbe's Number of the resin, a polymer solution prepared by dissolving a resin powder sample obtained by polymerization in a solvent dimethylacetamide in an amount of 10 wt % based on the total weight of the polymer solution was applied onto a silicon wafer at a rotation speed of 220 rpm by spin coating to form a film having a thickness of 20 μm, and then the resulting values according to the wavelength of light were obtained at 25° C. using an ellipsometer, and are each shown in the following Tables 3 to 5. Specifically, the refractive index was measured at a wavelength of 589 nm or 587 nm, and an Abbe's Number was obtained by the following Equation by measuring the refractive index ($n_D$, $n_F$, and $n_C$) at a wavelength of D (589 nm or 587 nm), F (486 nm), and C (656 nm), respectively.

$$\text{Abbe's Number} = (n_D - 1)/(n_F - n_C)$$

TABLE 3

| | Mn (g/mol) | Mw (g/mol) | Tg (° C.) | Refractive index (589 nm) | Abbe's Number |
|---|---|---|---|---|---|
| Example 1-1 | 7,000 | 12,000 | 138 | 1.649 | 21 |
| Example 1-2 | 9,400 | 17,000 | 135 | 1.659 | 18.5 |
| Example 1-3 | 8,500 | 15,000 | 132 | 1.666 | 18.8 |

TABLE 4

| | | Refractive index | Tg (° C.) | Abbe's Number | Mn | Mw | PDI |
|---|---|---|---|---|---|---|---|
| Example 2-1 | Resin 2-1 | 1.695 | 127 | 15.9 | 13000 | 22000 | 1.75 |
| Example 2-2 | Resin 2-2 | 1.658 | 110 | 20.2 | 15000 | 27000 | 1.81 |
| Example 2-3 | Resin 2-3 | 1.691 | 143 | 16.4 | 16000 | 31000 | 1.95 |

TABLE 4-continued

| | | Refractive index | Tg (° C.) | Abbe's Number | Mn | Mw | PDI |
|---|---|---|---|---|---|---|---|
| Example 2-4 | Resin 2-4 | 1.682 | 147 | 17 | 14000 | 23000 | 1.69 |
| Example 2-5 | Resin 2-5 | 1.665 | 168 | 19.5 | 19000 | 34000 | 1.78 |
| Example 2-6 | Resin 2-6 | |1.658 | 148 | 20.4 | 16000 | 29000 | 1.76 |
| Example 2-7 | Resin 2-7 | 1.662 | 150 | 20.1 | 17000 | 31000 | 1.83 |
| Example 2-8 | Resin 2-8 | 1.653 | 146 | 20.9 | 19000 | 33500 | 1.75 |
| Example 2-9 | Resin 2-9 | 1.642 | 153 | 22.7 | 18000 | 33000 | 1.81 |
| Example 2-10 | Resin 2-10 | 1.611 | 145 | 25.8 | 12000 | 22000 | 1.85 |
| Example 2-11 | Resin 2-11 | 1.657 | 187 | 20.8 | 10500 | 20000 | 1.96 |
| Example 2-12 | Resin 2-12 | 1.668 | 178 | 19.3 | 9500 | 17000 | 1.78 |
| Example 2-13 | Resin 2-13 | 1.652 | 179 | 20.7 | 8000 | 16000 | 2.01 |
| Example 2-14 | Resin 2-14 | 1.659 | 150 | 20.1 | 12000 | 22500 | 1.86 |
| Example 2-15 | Resin 2-15 | 1.658 | 147 | 20.3 | 13000 | 23000 | 1.79 |

TABLE 5

| | | RI | Tg (° C.) | Abbe's Number | Mn | Mw | PDI |
|---|---|---|---|---|---|---|---|
| Example 3-1 | Resin 3-1 | 1.695 | 117 | 15.1 | 26300 | 46000 | 1.75 |
| Example 3-2 | Resin 3-2 | 1.692 | 124 | 16.8 | 28600 | 48000 | 1.68 |
| Example 3-3 | Resin 3-3 | 1.680 | 152 | 18.3 | 18900 | 35000 | 1.85 |
| Example 3-4 | Resin 3-4 | 1.681 | 140 | 16.8 | 17700 | 32000 | 1.81 |
| Example 3-5 | Resin 3-5 | 1.651 | 145 | 21.5 | 21100 | 37000 | 1.75 |
| Example 3-6 | Resin 3-6 | 1.646 | 150 | 22.3 | 8300 | 17000 | 2.05 |
| Example 3-7 | Resin 3-7 | 1.671 | 145 | 17.9 | 19400 | 35000 | 1.80 |
| Example 3-8 | Resin 3-8 | 1.660 | 156 | 19.5 | 10600 | 21000 | 1.98 |
| Example 3-9 | Resin 3-9 | 1.656 | 168 | 18.9 | 9000 | 19000 | 2.11 |
| Example 3-10 | Resin 3-10 | 1.669 | 145 | 18.9 | 15500 | 28000 | 1.81 |
| Example 3-11 | Resin 3-11 | 1.653 | 148 | 19.9 | 17100 | 30000 | 1.75 |
| Example 3-12 | Resin 3-12 | 1.657 | 145 | 20.1 | 19300 | 33000 | 1.71 |
| Example 3-13 | Resin 3-13 | 1.666 | 146 | 19.1 | 16200 | 31000 | 1.91 |

In Tables 3 to 5, Mn means the number average molecular weight, Mw means the weight average molecular weight, PDI means the polydispersity index, RI means the refractive index, Tg means the glass transition temperature, the refractive indices of Table 3 are values measured at a wavelength of 589 nm, and the refractive indices of Tables 4 and 5 are values measured at a wavelength of 587 nm.

According to Tables 3 to 5, it could be confirmed that the resin according to an exemplary embodiment of the present disclosure includes the unit of Chemical Formula 1 and the unit of Chemical Formula 2, and in particular, the core structure of Chemical Formula 1 is a phenylene group, so that the refractive index of the resin was improved because the molecular volume is small and the ability to be packed is excellent. In addition, since Ar1 and Ar2 have electron-rich substituents, the electron density is high, so a resin including Ar1 and Ar2 has an improved refractive index.

Furthermore, since the unit of Chemical Formula 2 is included, the glass transition temperature (Tg) and refractive index can be adjusted, and the chain behavior of the resin can be made flexible, so that there is a technical effect advantageous for the injection processing of a molded article.

According to Table 5, it could be seen that for the resin, a resin having desired physical properties can be prepared by appropriately adjusting the molar ratio of the polyester precursor and the polycarbonate precursor, and the isomer to combine the characteristics of the polyester resin and the polycarbonate resin.

Therefore, since a high refractive index is preferentially required for high refractive performance in order to appropriately apply the resin according to the exemplary embodiments of the present disclosure to a molded article such as an optical lens, it could be confirmed that the resins of the Examples are better as optical materials.

The invention claimed is:

1. A resin, comprising:
    a unit represented by the following Chemical Formula 1; and a unit represented by the following Chemical Formula 2:

[Chemical Formula 1]

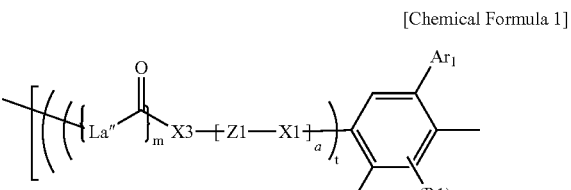

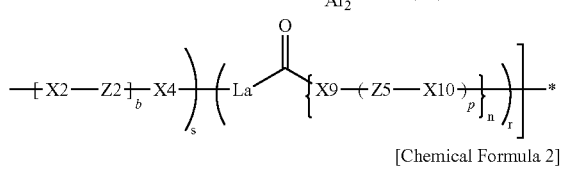

[Chemical Formula 2]

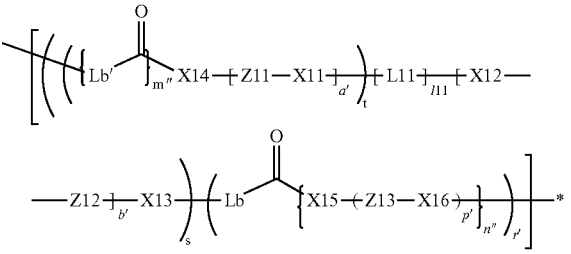

wherein, in Chemical Formulae 1 and 2,

Ar1 and Ar2 are the same as or different from each other, and are each independently a substituted or unsubstituted polycyclic aryl group having 10 to 30 carbon atoms, R1 is hydrogen, deuterium, a halogen group, a cyano group, a substituted or unsubstituted alkyl group, a substituted or unsubstituted cycloalkyl group, a substituted or unsubstituted alkoxy group, a substituted or unsubstituted silyl group, a substituted or unsubstituted aryl group, or a substituted or unsubstituted heteroaryl group, r1 is an integer of 1 or 2, and when r1 is 2, each R1 is the same as or different from each other, X1 to X4, X9 and X10 are the same as or different from each other, and are each independently O or S, Z1, Z2 and Z5 are the same as or different from each other, and are each independently a substituted or unsubstituted alkylene group, a substituted or unsubstituted cycloalkylene group, a substituted or unsubstituted arylene group, or a substituted or unsubstituted heteroarylene group, La and La" are the same as or different from each other, and are each independently a direct bond or —C(=O)-L-, L is a substituted or unsubstituted arylene group, a, b and p are the same as or different from each other, and are each independently an integer from 0 to 6, and when a, b and p are each 2 to 6, each a-group, b-group, and p-group is the same as or different from each other, t is an integer from 1 to 6, and when t is 2 to 6, each t-group is the same as or different from each other, Lb and Lb' are the same as or different from each other, and are each independently a direct bond or —C(=O)-L'-, L' is a substituted or unsubstituted arylene group, a', b' and p' are the same as or different from each other, and are each independently an integer from 0 to 6, and when a', b' and p' are each 2 to 6, each a'-group, b'-group, and c'-group is the same as or different from each other, t" is an integer from 1 to 6, and when t" is 2 to 6, each t"-group is the same as or different from each other, m" and n" are the same as each other, and are 0 or 1, when m" and n" are 0, t", r' and s' are 1, and Lb is-C(=O)-L'-, when m" and n" are 1, t" is an integer from 1 to 6, r'+s' is =1, r' is 0<r'<1, and s' 0<s' <1.

2. The resin of claim 1, wherein Chemical Formula 1 is the following Chemical Formula 1-1 or 1-2:

[Chemical Formula 1-1]

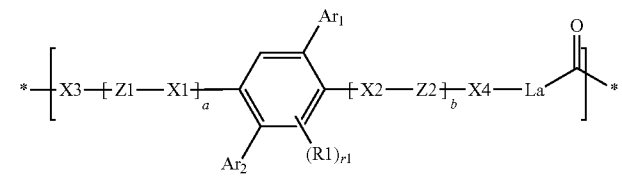

[Chemical Formula 1-2]

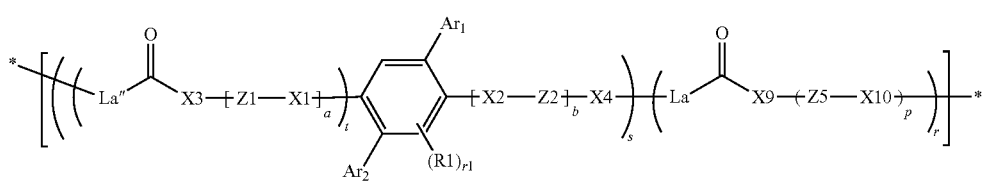

m and n are the same as each other, and are 0 or 1, when m and n are 0, t, r and s are 1, and La is-C(=O)-L-, when m and n are 1, t is an integer from 1 to 6, r+s=1, r is 0<r<1, and s is 0<s<1, L11 is a substituted or unsubstituted alkylene group, a substituted or unsubstituted cycloalkylene group, or a substituted or unsubstituted arylene group, l11 is an integer from 1 to 5, and when l11 is 2 to 5, two or more L11 are the same as or different from each other, X11 to X16 are the same as or different from each other, and are each independently O or S, Z11 to Z13 are the same as or different from each other, and are each independently a substituted or unsubstituted alkylene group, or a substituted or unsubstituted cycloalkylene group, in Chemical Formula 1-1, Ar1, Ar2, R1, r1, X1 to X4, Z1, Z2, a and b are the same as those defined in Chemical Formula 1, La is-C(=O)-L-, L is a substituted or unsubstituted arylene group, in Chemical Formula 1-2, Ar1, Ar2, R1, r1, X1 to X4, X9, X10, Z1, Z2, Z5, a, b, t and p are the same as defined in Chemical Formula 1, La and La" are the same as or different from each other, and are each independently a direct bond or —C(=O)-L-, L is a substituted or unsubstituted arylene group, r is 0<r<1, s is 0<s<1, and r+s=1.

3. The resin of claim 1, wherein Chemical Formula 2 is the following Chemical Formula 2-1 or 2-2:

[Chemical Formula 2-1]

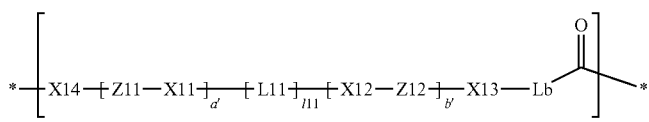

-continued

[Chemical Formula 2-2]

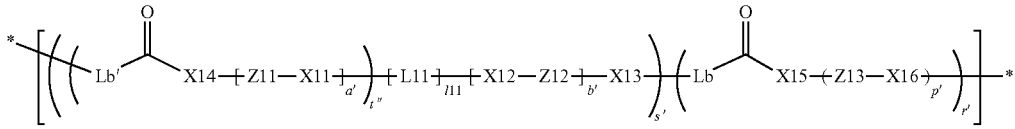

in Chemical Formula 2-1,
L11, l11, X11 to X14, Z11, Z12, a' and b' are the same as defined in Chemical Formula 2,
Lb is -C(=O)-L'-,
L' is a substituted or unsubstituted arylene group, and
in Chemical Formula 2-2,
L11, l11, X11 to X16, Z11, Z12, Z13, a', b', t" and p' are the same as defined in Chemical Formula 2,
Lb and Lb' are the same as or different from each other, and are each independently a direct bond or —C(=O)-L'-,
L' is a substituted or unsubstituted arylene group,
r' is 0<r'<1,
s' is 0<s'<1, and
r'+s'=1.

4. The resin of claim 1, wherein Chemical Formula 2 is the following Chemical Formula 2-3:

[Chemical Formula 1a]

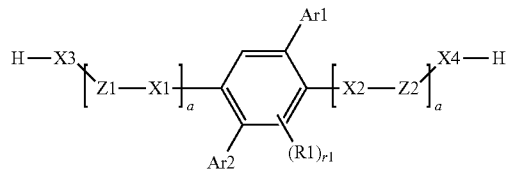

[Chemical Formula 2a]

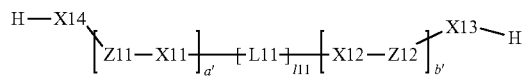

[Chemical Formula 2-3]

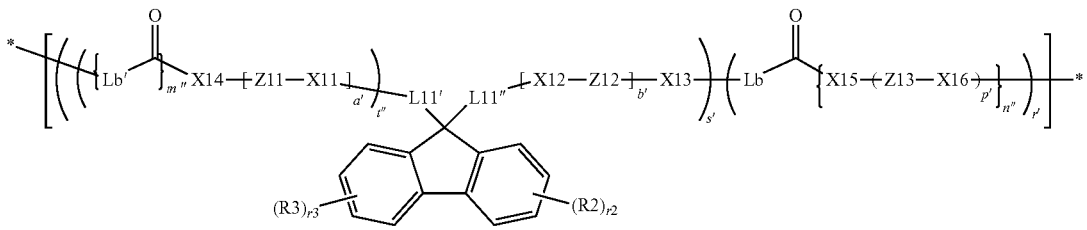

in Chemical Formula 2-3,
X11 to X16, Z11 to Z13, Lb, Lb', a', b', m", n", t", s' and r' are the same as defined in Chemical Formula 2,
R2 and R3 are the same as or different from each other, and are each independently hydrogen, or a substituted or unsubstituted alkyl group,
r2 and r3 are each an integer from 1 to 4, and when r2 is 2 to 4, two or more R2 are the same as or different from each other, and when r3 is 2 to 4, two or more R3 are the same as or different from each other, and
L11' and L11" are the same as or different from each other, and are each independently a substituted or unsubstituted arylene group, or a heteroarylene group.

5. The resin of claim 1, wherein the resin has a weight average molecular weight of 3,000 g/mol to 500,000 g/mol.

6. The resin of claim 1, wherein the resin has a glass transition temperature (Tg) of 90° C. to 200° C.

7. The resin of claim 1, wherein the resin has a refractive index of 1.50 to 1.75, wherein the refractive index is measured at a wavelength of 587 nm or 589 nm.

8. A method for preparing the resin of claim 1, the method comprising:
polymerizing a composition including a compound of the following Chemical Formula 1a, a compound of the following Chemical Formula 2a, and one of a polyester precursor or a polyester precursor and a polycarbonate precursor:

wherein, in Chemical Formulae 1a and 2a,
Ar1, Ar2, R1, r1, X1 to X4, Z1, Z2, a and b are the same as defined in Chemical Formula 1, and
L11, l11, X11 to X14, Z11, Z12, a' and b' are the same as defined in Chemical Formula 2.

9. The method of claim 8, wherein the polyester precursor is represented by the following Chemical Formula A, and the polycarbonate precursor is represented by the following Chemical Formula B:

[Chemical Formula A]

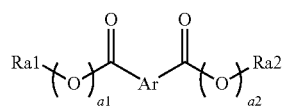

[Chemical Formula B]

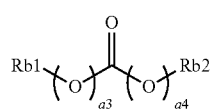

in Chemical Formulae A and B,
Ra1, Ra2, Rb1 and Rb2 are the same as or different from each other, and are each independently hydrogen, a halogen group, a hydroxyl group, a substituted or unsubstituted alkyl group, or a substituted or unsubstituted aryl group, Ar is a substituted or unsubstituted arylene group, and a1 to a4 are each 0 or 1.

10. A resin composition comprising the resin of claim 1.

11. A molded article comprising the resin composition of claim 10.

12. The molded article of claim 11, wherein the molded article is an optical lens.

* * * * *